United States Patent [19]

Ono

[11] Patent Number: 5,640,261
[45] Date of Patent: Jun. 17, 1997

[54] OPTICAL OPERATION APPARATUS FOR FINDING AN INNER PRODUCT OF VECTORS USING LIGHT

[75] Inventor: Shuji Ono, Kanagawa-ken, Japan

[73] Assignee: Fuji Photo Film Co., Ltd., Kanagawa, Japan

[21] Appl. No.: 515,602

[22] Filed: Aug. 16, 1995

[30] Foreign Application Priority Data

Aug. 18, 1994 [JP] Japan .................................... 6-194316

[51] Int. Cl.$^6$ ................................ G06E 3/00; G06G 7/16
[52] U.S. Cl. ................................................ 359/107; 395/25
[58] Field of Search ................................ 359/107; 395/25

[56] References Cited

U.S. PATENT DOCUMENTS

5,113,485  5/1992  Horan et al. ............................ 395/25

FOREIGN PATENT DOCUMENTS

2-96818  4/1990  Japan ................................ 359/107

OTHER PUBLICATIONS

Japanese Journal of Applied Physics, vol. 29, No. 7, Jul. 1990, Tokyo JP, pp. 11325–11327.

Zhang et al., "Optoelectronic Implementation of Bipolar Analog Neural Network Using Shadow Casting" IEEE Photonics Technology Letters, vol. 6, No. 4, Apr. 1994 New York US, pp. 552–554.

Turner et al., "CMOS Photodetectors for Correlation Peak Location" Applied Optics, vol. 24, No. 10, May 15, 1985, New York US, pp. 1469–1475.

"Optical Implementation of the Hopfield Model" by Nabil H. Farhat, Demetri Psaltis, Aluizio Prata and Eung Paek, Applied Optics/vol. 24, No. 10/ pp. 1469–1475/ May 15, 1985.

*Primary Examiner*—Jon W. Henry
*Attorney, Agent, or Firm*—Sughrue, Mion, Zinn, Macpeak & Seas

[57] ABSTRACT

In an optical operation apparatus for carrying out an operation for finding an inner product of a first vector and a second vector by utilizing light, an optical vector encoding system forms an encoded distribution, which is based on all of elements of the first and second vectors, in which the intensities have been encoded in accordance with the values of the elements of the first vector, and in which the centers of gravity of local intensities have been position encoded in accordance with the values of the elements of the second vector. A product sum decoding system extracts a value of an inner product of the first vector and the second vector in accordance with the encoded distribution having been formed by the optical vector encoding system, and feeds out the information representing the inner product value.

6 Claims, 19 Drawing Sheets

LED  PH  PSD

F I G. 27
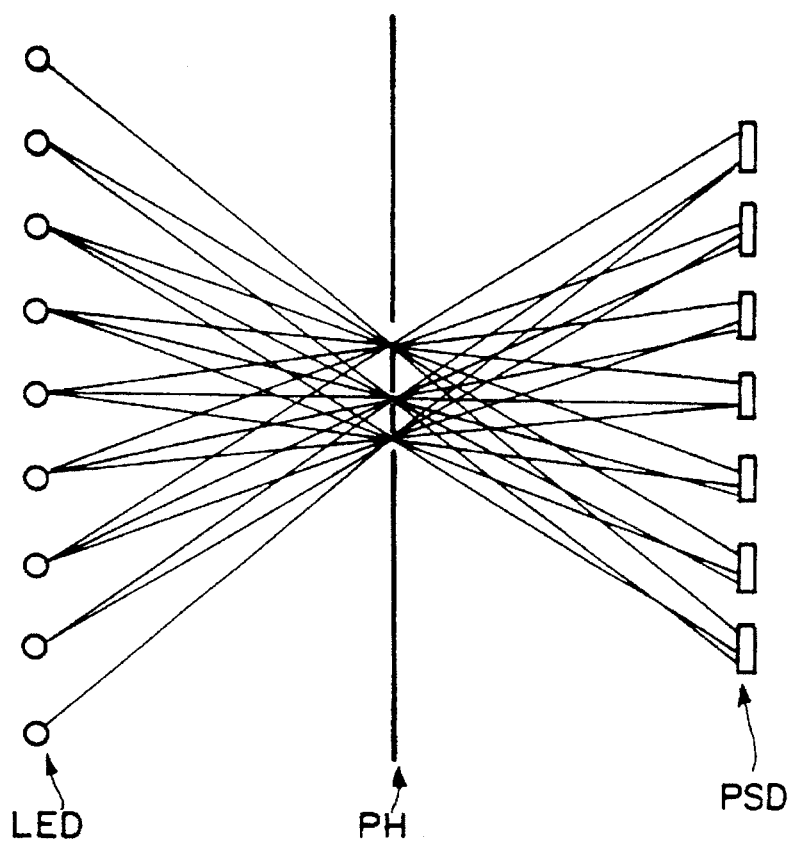
F I G. 28
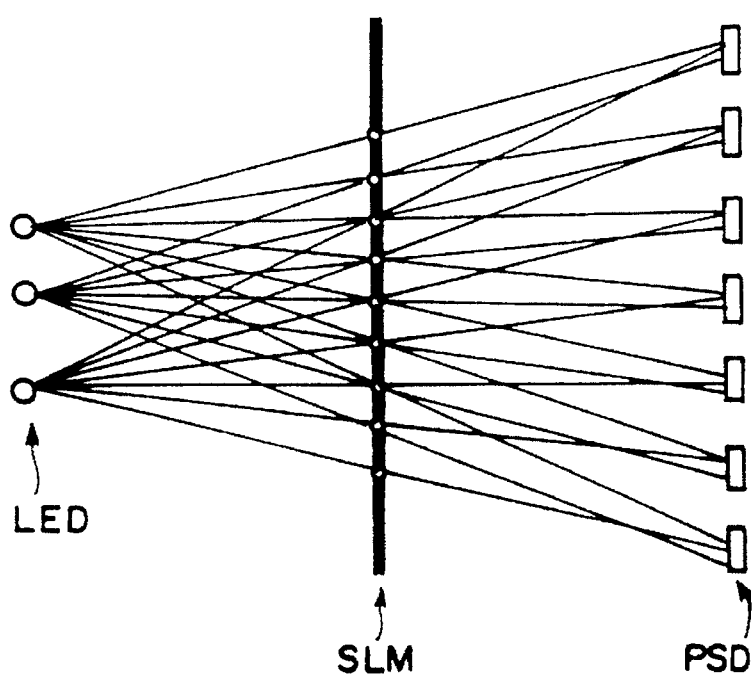

$I_{1\sim 3}$
$O_{1\sim 3}$
$W_{11\sim 33}$ $V_i$
$T_{ij}$
$U_j$

OPTICAL OPERATION APPARATUS FOR FINDING AN INNER PRODUCT OF VECTORS USING LIGHT

BACKGROUND OF THE INVENTION

1. Field of the Invention

This invention relates to an optical operation apparatus for carrying out an operation for finding an inner product of a first vector and a second vector by utilizing light.

2. Description of the Prior Art

Optical waves have important features that they enable parallel information transfer and parallel information processing. These features of optical waves match the needs in the field of information processing in recent years, and there has arisen a tendency in the field of information processing toward increased use of optical operation techniques. Therefore, recently, extensive research has been carried out in order to form new information processing systems utilizing optical waves as the media. The new information processing systems aim at carrying out various operations in parallel on very large amounts of numerical information and thus quickly carrying out large amounts of operations. Such information processing systems are referred to as optical computing systems or optical computers.

Examples of basic operation techniques utilizing light include multiplications carried out by modulating light, spatial integrations utilizing optical elements, such as lenses, and additions carried out with temporal integrations utilizing a storage type of detector. In particular, research has been carried out from old times in order to conduct real-time vector-matrix multiplications with a spatial integration method. With the technique for carrying out the real-time vector-matrix multiplications, a vector-matrix multiplication is carried out in the same manner as that in the actual mathematics. At this time, the multiplication is carried out with the modulation of optical intensity, and the addition is carried out with the converging effects (the spatial integration effects) of lenses.

The vector-matrix multiplication can be represented by a simple formula. However, the vector-matrix multiplication is a basic operation for solving various scientific and technological problems and is one of primary numerical operations to be carried out with computers. The vector-matrix multiplication is applicable to a wide variety of fields, such as linear algebraic operations using difference equations, partial differential equations, and the like, operations for finding least square solutions, deconvolution, problems of eigen values and eigen vectors of matrixes, calculations with the method of least squares, signal processing, image processing, and neural networks. In particular, in the fields of the computational physics, images, and control, two- and three-dimensional correlation problems are processed frequently. In such cases, the number of elements of matrixes becomes very large and, even if super computers are utilized, considerable time and expenses are required to carry out the operations.

FIG. 32 is an explanatory view showing the concept behind a vector-matrix multiplication with a spatial integration method. In FIG. 32, lenses, and the like, are not shown. Values of components of a vector I are given as an optical intensity distribution to the positions of $I_1$, $I_2$, and $I_3$. Also, a two-dimensional spatial light modulator, which represents a multiplicand matrix W, is utilized. Values of components of the matrix W are given by power transmittances of small openings (i.e., picture elements) of the spatial light modulator. The light, which represents the vector I, is uniformly spread in the vertical direction and irradiated to the spatial light modulator W. At this time, with respect to the horizontal direction, the vector I and the matrix W have an image formation relationship. The transmittance of the small opening, which corresponds to a position (i,j) in the spatial light modulator, is proportional to $W_{ij}$. The intensity of the light, which has passed through the small opening corresponding to the position (i,j), is proportional to the product $I_i W_{ij}$. The light, which has passed through the spatial light modulator, is converged with respect to the horizontal direction and forms an image with respect to the vertical direction. Therefore, the optical intensity at a position j on an output wave front is proportional to the value of $O_j$ (i.e., the j component of the product). Specifically, vectors $O_1$, $O_2$, and $O_3$, which are the results of the multiplications, are obtained as optical intensity distributions at the positions $O_1$, $O_2$, and $O_3$ in FIG. 32.

Typical examples of the vector-matrix multiplication apparatuses of this type include a Stanford processor, which has been proposed by Prof. J. W. Goodman, Stanford University, et al. With the proposed Stanford processor, a vector I is given by an optical intensity distribution of light radiated from an LED array, and a matrix W is given by a transmittance distribution of a two-dimensional spatial light modulator. The Stanford processor has the features described below.

(a) Operations can be carried out very quickly. In cases where the number of matrix elements is equal to 100×100 and the response frequencies of a light source and a detector are equal to 100 MHz, $10^{12}$ times of product sum operations per second can be carried out.

(b) All of operations are carried out in parallel. This feature is enabled by the utilization of light and represents, particularly, the importance and effects of optical operations.

(c) The apparatus is operable with incoherent light. Therefore, less noise occurs due to dust, or the like, than noise occurring with an optical information processing apparatus, which utilizes coherent light.

However, it has been pointed out that the Stanford processor has the drawbacks described below.

(a) Only the real numbers other than negative numbers can be dealt with. This is because operations are based upon the optical intensity and the light transmittance. Therefore, in cases where signed values and complex numbers are to be dealt with, encoding processes must be carried out, or a plurality of operation apparatuses must be used.

(b) The accuracy cannot be kept high. This generally applies to analog processors.

(c) The matrix W is approximately fixed. This is because the response speeds of most of the currently developed two-dimensional spatial light modulators are on the order of milliseconds and are thus markedly slower than the response speeds of the light source and the detector. Therefore, the Stanford processor is not suitable for applications in which it is necessary to quickly alter matrix values.

Among the above-enumerated drawbacks, the drawback in that only the real numbers other than negative numbers can be dealt with is very inconvenient to most of the application fields described above. For example, this drawback is very inconvenient to an optical neural network, which has attracted particular attention as a field of application of the vector-matrix multiplication.

How a neural network operates will be described hereinbelow.

The neural network is an information processing model, which simulates the excellent information processing functions of a living body. The neural network comprises a very large number of neuron elements (i.e., neural cell elements), which are interconnected with various levels of strengths. Signals are transmitted through the neural circuit, and information processing is thereby carried out in parallel.

FIG. 33 is an explanatory view showing a Hopfield model, which is one of typical neural network models. With reference to FIG. 33, neuron outputs $U_j$ of a next step are determined with the formula shown below from neuron outputs $V_i$ and a neuron connection matrix $T_{ij}$. The outputs $U_j$ are again used as inputs, and the signal processing is iterated recurrently until the outputs reach the stable state. In the formula shown below, $I_j$ represents the threshold value.

$$U_j = \sum_{i=1}^{N} T_{ij} \cdot V_i + I_j$$

The state of each neuron element may be taken as the value of a vector element, and the strength of the connection between the neurons may be taken as the value of the element of the matrix. In such cases, the operation of the neural network is equivalent to the iterated execution of the vector-matrix multiplication.

From the aforesaid point of view, extensive research has been carried out in order to form an optical neural network by an optical vector-matrix multiplication apparatus. Typically, a novel technique has been proposed by a group of D. Psaltis, et al. of University of California. The technique is described in "Optical Implementation of the Hopfield Model" by Nabil H. Farhat, Demetri Psaltis, Aluizio Prata, and Eung Paek, APPL. OPT., Vol. 24, No. 10, 1469, 1985.

FIGS. 34 and 35 are explanatory views showing a constitution for optical implementation of the Hopfield model proposed by D. Psaltis, et al. It will be understood that the part for executing the optical vector-matrix multiplication is based on the same principle as the principle of the Stanford processor described above. However, it is essentially necessary for a neural network to be provided with an inhibitory neuron connection. Therefore, D. Psaltis, et al. employed a method wherein two sets of Stanford processors are located side by side. One of the Stanford processors is employed for the excitatory connection, and the other Stanford processor is employed for the inhibitory connection. Vector-matrix multiplications are independently carried out by the two sets of the Stanford processors, and thereafter the outputs of the Stanford processors are electrically subtracted from each other. In this manner, the inhibitory neuron connection, which is necessary for an optical neural network, is implemented.

As described above, the technique for carrying out the real-time optical multiplication of a vector and a matrix with the spatial integration method, typically with the Stanford processor, has the advantages with regard to simpleness, anti-noise characteristics, quick operations, and perfect parallel operations. However, a value is expressed by an optical intensity, the problems occur in that negative values cannot be dealt with and in that subtraction cannot be carried out. Such problems constitute obstacles to the application to an optical neural network and various numeric calculations.

As in the method proposed by D. Psaltis, et al., if two optical systems are employed to work respectively for a negative value and a positive value, it becomes possible to deal with a negative value. However, in such cases, the size of the apparatus is doubled and cannot be kept small.

Also, in cases where two optical systems are used, the problems occurs in that it is difficult for values in the vicinity of zero to be expressed accurately and smoothly. This is because, with the method proposed by D. Psaltis, et al., the range from a negative value to zero is covered by one of the two optical systems, and the range from zero to a positive value is covered by the other optical system. Therefore, it becomes necessary for a light modulating medium, which is used in order to express a matrix value by each optical system, to have optical characteristics such that the light transmittance may rise immediately and linearly from zero. However, actually, in most light modulating media, saturation characteristics are exhibited and the linearity becomes bad as the transmittance becomes closer to zero. Also, with the light modulating media which are currently available, it is not always possible to set the transmittance to be exactly zero, and the problems with regard to leak light occur inevitably.

Further, such that values can be expressed with good linearity over a wide range from a negative value to a positive value, it is necessary to restrict fluctuations in the characteristics of light emitting devices, such as LED's, fluctuations in the transmittance characteristics of light modulating media, fluctuations in the sensor sensitivity, and the like, between the two optical systems.

As described above, the technique for utilizing the two optical systems has various practical problems.

SUMMARY OF THE INVENTION

The primary object of the present invention is to provide an optical operation apparatus, which has advantages of a Stanford processor with regard to simpleness, anti-noise characteristics, quick operations, and perfect parallel operations, and which eliminates practical problems in that a negative number cannot be processed and in that subtraction cannot be carried out.

Another object of the present invention is to provide an optical operation apparatus, wherein values in the vicinity of zero can be expressed accurately and smoothly, and wherein values can be expressed with good linearity over a wide range from a negative value to a positive value.

The present invention provides an optical operation apparatus for carrying out an operation for finding an inner product of a first vector and a second vector by utilizing light, the optical operation apparatus comprising:

i) an optical vector encoding means for forming an encoded distribution, which is based on all of elements of the first and second vectors, and in which the intensities have been encoded in accordance with the values of the elements of the first vector, and the centers of gravity of local intensities have been position encoded in accordance with the values of the elements of the second vector, and ii) a product sum decoding means for extracting a value of an inner product of the first vector and the second vector in accordance with the encoded distribution, which has been formed by the optical vector encoding means, and feeding out the information representing the inner product value.

In the optical operation apparatus in accordance with the present invention, the product sum decoding means should preferably comprise an optical signal detecting means, which generates electric signals in accordance with the intensities and/or the positions of received light, and an electric operation means, which carries out an operation on the electric signals having been generated by the optical signal detecting means.

Also, in the optical operation apparatus in accordance with the present invention, the optical vector encoding means should preferably comprise an optical distribution generating means for generating an encoded optical distribution, which is based on all of the elements of the first and second vectors, and which has been optical intensity encoded and position encoded.

Further, in the optical operation apparatus in accordance with the present invention, the optical vector encoding means should preferably be provided with:

a) an optical distribution generating means for generating encoded optical distributions, each of which has been optical intensity encoded for one of the elements of the first vector and position encoded for one of the elements of the second vector, b) a multiple image forming optical system for superposing the encoded optical distributions, each of which has been encoded for one of the elements of the first vector and for one of the elements of the second vector, one upon another, and thereby generating an encoded optical distribution, which is based on all of the elements of the first and second vectors, and c) an output surface, to which the encoded optical distribution based on all of the elements of the first and second vectors is fed out, the encoded optical distributions, each of which has been encoded for one of the elements of the first vector and for one of the elements of the second vector, being fed out to the output surface by the multiple image forming optical system, whereby the encoded optical distribution based on all of the elements of the first and second vectors is fed out to the output surface.

Furthermore, in the optical operation apparatus in accordance with the present invention, the optical vector encoding means should preferably be provided with:

a) an optical distribution generating means for generating an optical intensity encoded distribution of the first vector, b) an optical system, in which a position encoded distribution of the second vector is taken as a point spread function, and c) an output surface, to which an encoded optical distribution based on all of the elements of the first and second vectors is fed out, the optical intensity encoded distribution of the first vector being fed out to the output surface by the optical system, whereby the encoded optical distribution based on all of the elements of the first and second vectors is fed out to the output surface.

Moreover, in the optical operation apparatus in accordance with the present invention, the optical vector encoding means should preferably be provided with:

a) an optical distribution generating means for generating a position encoded distribution of the second vector, b) an optical system, in which an optical intensity encoded distribution of the first vector is taken as a point spread function, and c) an output surface, to which an encoded optical distribution based on all of the elements of the first and second vectors is fed out, the position encoded distribution of the second vector being fed out to the output surface by the optical system, whereby the encoded optical distribution based on all of the elements of the first and second vectors is fed out to the output surface.

With the optical operation apparatus in accordance with the present invention, an operation for finding the inner product of the first vector and the second vector is carried out by utilizing light. Specifically, the optical vector encoding means forms the encoded optical distribution, in which the intensities have been optically encoded in accordance with the values of the elements of the first vector, and the centers of gravity of local intensities have been position encoded in accordance with the values of the elements of the second vector. In this manner, the encoded optical distribution, in which the intensities and the centers of gravity of intensities have been displaced, is formed.

Thereafter, the product sum decoding means extracts the value of the inner product of the first vector and the second vector in accordance with the encoded optical distribution, which has been formed by the optical vector encoding means. The product sum decoding means feeds out the information representing the inner product value. Specifically, as a result of the displacement of the intensities of the first vector by the second vector, the positions of the intensities are displaced in accordance with the levels or the positive and negative signs of the values of the elements of the second vector. Therefore, the value of the inner product of the first vector and the second vector can be found from the encoded intensities and the encoded amounts of displacement.

As described above, with the optical operation apparatus in accordance with the present invention, the values of the elements of the first and second vectors are encoded as the intensities and the positions, at which the centers of gravity of the intensities are located. Therefore, the optical operation apparatus in accordance with the present invention has an excellent feature in that signed real numbers can be processed as the values of the elements. This feature could not be obtained with conventional techniques, such as the technique utilizing the Stanford processor. The capability of dealing with signed analog real numbers is very advantageous for applications to algebraic operations and neural networks. Further, because the values of the elements of the vector are encoded as the positions, at which the centers of gravity of the intensity distributions are located, values in the vicinity of zero can be expressed accurately and smoothly, and values can be expressed with good linearity over a wide range from a negative value to a positive value.

BRIEF DESCRIPTION OF THE DRAWINGS

FIG. 27 is an explanatory view showing a system for carrying out space invariant local convolution, FIG. 28 is an explanatory view showing a system for carrying out space invariant local convolution.

DESCRIPTION OF THE PREFERRED EMBODIMENTS

Features of an optical product sum operation will be described hereinbelow.

The optical product sum operation has the following features:

a) Encoded optical distributions are formed, in which the values of multiplier elements are encoded into intensities, and the values of multiplicand elements are encoded into positions, at which the centers of gravity of the intensities are located.

b) Thereafter, the encoded optical distributions are fed into a product sum decoding means, which comprises a photo detecting device and an electric operation means, which carries out an operation on electric signals having been generated by the photo detecting device. As an output, "the value of the product sum between the multiplier elements and the multiplicand elements" is obtained.

A particular feature of the optical product sum operation technique is that the values of the multiplicand elements are encoded as the information representing the position, and therefore signed real numbers can be processed as the values of the elements. This feature could not be obtained with conventional techniques, such as the technique utilizing the Stanford processor. The capability of dealing with signed real numbers is very advantageous for applications to algebraic operations and neural networks. Also, the encoding of the values of the elements into the information representing the position leads to practical easiness of processing in that values in the vicinity of zero can be expressed accurately and smoothly, and values can be expressed with good linearity over a wide range from a negative value to a positive value.

The present invention will hereinbelow be described in further detail with reference to the accompanying drawings.

One of the simplest examples of the optical product sum operation techniques will be described hereinbelow. One of the simplest examples is to calculate the scalar product of two values, i.e. is "multiplication." A product O of two values a and b is represented by Formula (1).

$$O = a \cdot b \tag{1}$$

Figure 1:
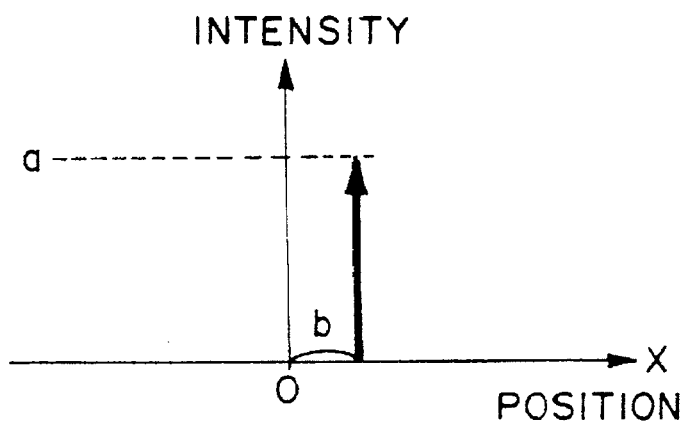
FIG. 1 is an explanatory view showing an encoded optical distribution.

FIG. 1 shows a typical example of an encoded optical distribution C(x), which is formed from the two values a and b. The encoded optical distribution C(x) shown in FIG. 1 is a pattern of light, in which the optical intensity is equal to a, and the center of gravity is located at a position b. Such a pattern of light (i.e., an optical distribution) can be expressed easily with Formula (2) by using the Kronecker's delta function.

$$C(x) = a \cdot \delta(x-b) \tag{2}$$

A product sum decoding means, which obtains the value of the product O of a and b from the encoded optical distribution C(x) by a single process, will be described hereinbelow.

As the product sum decoding means, a position sensitive light detector (hereinafter referred to as the PSD) and an electric operation means, which carries out an operation on electric signals having been generated by the PSD, are used in combination.

How the PSD works will be described hereinbelow. In general, the PSD is an optical sensor used primarily for detecting the position of a light spot. The optical sensor has heretofore been used widely as a position sensor by being combined with a light source and an electric operation means. PSD's having various sizes, shapes, and spectral sensitivities have been used in accordance with the fields of application. Also, PSD's are classified into a one-dimensional PSD, which is used to detect the position of a light spot located along a single axis, and a two-dimensional PSD, which is used to detect the position of a light spot with respect to two axes, i.e. to detect the position of a light spot located on a surface. The one-dimensional PSD is used in combination with an electric operation means for a one-dimensional operation. The two-dimensional PSD is used in combination with an electric operation means for a two-dimensional operation.

The PSD has an outer appearance similar to that of an ordinary photodiode optical sensor. The PSD comprises a semiconductor having a pn junction surface for converting incident light into an electric signal, terminals connected to the semiconductor for feeding out the outputs (ordinarily, electric currents), and an enclosure which is constituted of a resin or a metal and in which the semiconductor and the terminals are housed. The PSD has the differences from the photodiode in that, in order for the PSD to be provided with the position detecting function, the p-layer or both of the p- and n-layers of the pn junction are constituted as resistance layers having uniform electric resistance values, and in that the output terminals are connected as a pair to the two ends of the p-layer.

Figure 2:
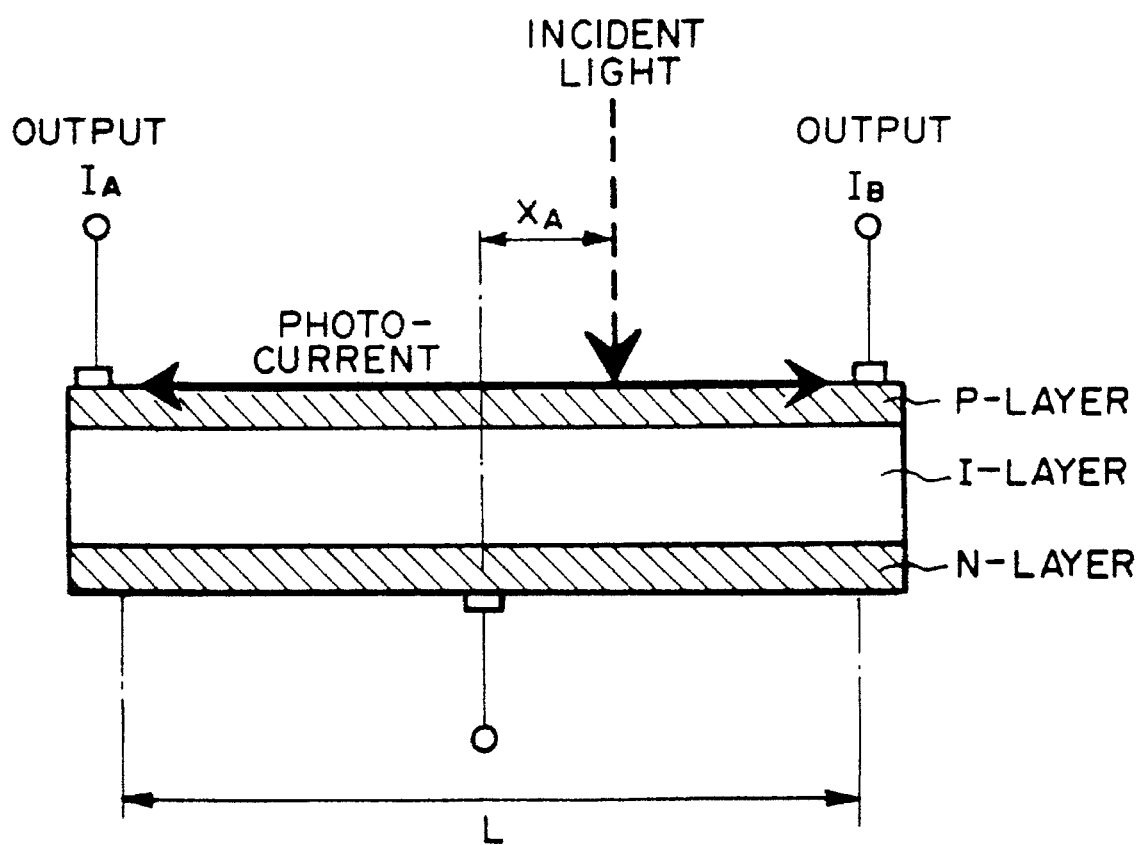
FIG. 2 is an explanatory view showing an example of a position sensitive light detector (PSD)

FIG. 2 is an explanatory view showing an example of a one-dimensional PSD. When a light beam impinges upon the PSD, the same amounts of positive and negative electric charges are generated by the incident light beam in the semiconductor. The electric charges pass through the junction and appear as positive electric charges at a position in the p-layer, which position is located in the vicinity of the point of incidence of the light beam, and as negative electric charges at a position in the n-layer, which position is located in the vicinity of the point of incidence of the light beam. As a result, a nonuniform distribution of the positive electric charges occurs in the p-layer, and streams of the electric charges are thereby generated in the p-layer. The streams of the electric charges, i.e. the electric currents, are taken as output currents $I_A$ and $I_B$ out of the pair of the output electrodes located at the two ends of the p-layer. The amounts of the electric currents taken out of the pair of the output electrodes are inversely proportional to the distances between the point of incidence of the light beam and the electrodes located at the two ends of the p-layer. The middle position in the PSD is taken as the origin, and the distance between the origin and the point of incidence of the light beam is represented by $x_A$. Also, the distance between the output electrodes located at the two ends of the PSD is represented by L, and the total output current, which is the sum of the output currents $I_A$ and $I_B$, is represented as $I_C$. In such cases, the formulas shown below obtain.

$$hE = I_C = I_A + I_B \tag{3}$$

$$I_A = \frac{k}{2}\left(1 - \frac{2}{L}x\right)I_C \tag{4}$$

$$I_B = \frac{k}{2}\left(1 + \frac{2}{L}x\right)I_C \tag{5}$$

The PSD was developed primarily for the purposes of detecting the position of a light beam. In the primary use method for detecting the position of the light beam, the information representing the position is obtained by an electric operation circuit, in which the difference between the output currents $I_A$ and $I_B$ is divided by the total output current $I_C$.

However, in the product sum decoding means employed in the optical operation apparatus in accordance with the present invention, instead of the primary use method of the PSD being carried out, the difference between the output currents $I_A$ and $I_B$ obtained from the output electrodes is calculated and, when necessary, is multiplied by an appropriate fixed number. The output obtained as a result of the difference operation is represented by $$I_A - I_B = \frac{k}{2}\left(1 + \frac{2}{L}x\right)I_C - \frac{k}{2}\left(1 - \frac{2}{L}x\right)I_C \tag{6}$$
$$= \frac{2k}{L} \times I_C = \frac{2kh}{L} \times E$$

The former term in the last portion of this formula is constant. Therefore, it can be found that this output is proportional to the product of the intensity E of the light beam and the position of incidence x of the light beam.

The "encoded optical distribution C(x) formed from the two values a and b" described above is the pattern of light, in which a peak having the intensity a is located at the position b. Therefore, when the encoded optical distribution C(x) is fed into the combination of the PSD sensor and the difference operation circuit described above, an output proportional to the product O of the intensity a and the position b, which is represented by O=a·b, can be obtained.

Therefore, by the appropriate selection of the fixed number of the gain in the electric operation means, the product O of the intensity a and the position b, which is represented by O=a·b, can be obtained immediately as the output.

Figure 3:
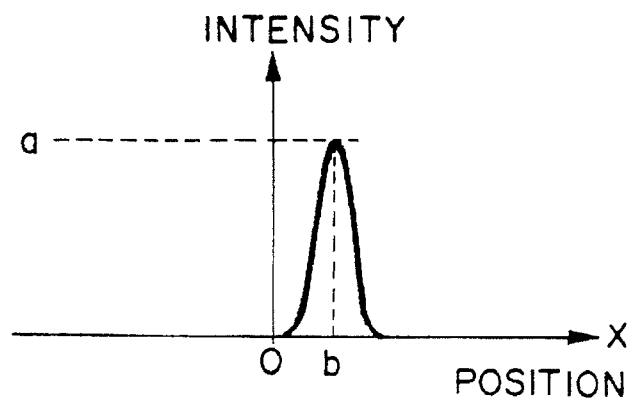
FIG. 3 is an explanatory view showing an encoded optical distribution with a pattern spread like a Gaussian function.
Figure 4:
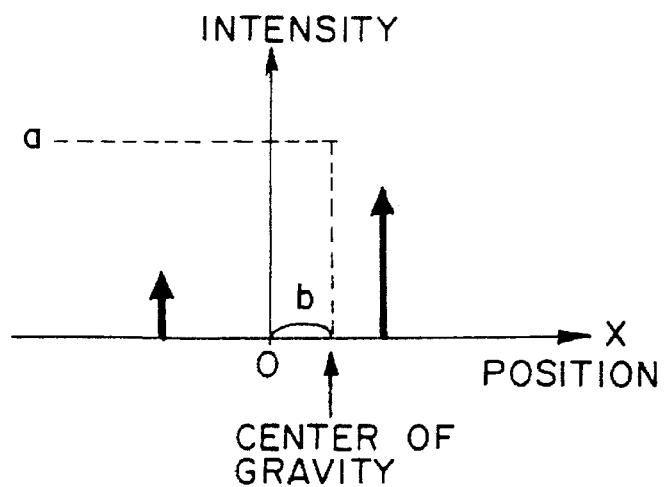
FIG. 4 is an explanatory view showing an encoded optical distribution with a combination of a plurality of delta functions.

In the aforesaid example of the encoded optical distribution, the encoded optical distribution is expressed by the delta function as illustrated in FIG. 1. However, the information detected by the PSD sensor and the operation circuit, which constitute the product sum decoding means, is the product of the total intensity of the incident optical pattern and the position of the center of gravity of the intensity. Therefore, the essential point of the optical encoding is to form a pattern of light, in which the total intensity of light is equal to a, and the center of gravity of the intensity is located at the position b. Accordingly, the encoded optical distribution may be the distribution as illustrated in FIG. 3, in which the peak is spread like a Gaussian function, or the distribution as illustrated in FIG. 4, which is composed of a combination of a plurality of delta functions.

In this manner, various variations are possible in the optical encoding. Therefore, the constitution of the optical operation system can be selected from a wide varieties, and the degree of freedom of design can be kept high.

Examples of the varieties of the encoding methods will be described hereinbelow. In cases where the bimodal function is used as the encoded optical distribution as illustrated in FIG. 3 and FIG. 4, as the product sum decoding means, it is possible to employ a combination of two photo detecting devices, for example, photodiodes (hereinafter referred to as the PD's), which are located in a pair, and an electric operation means, which carries out an operation on the electric signals fed out from the two photo detecting devices.

At this time, the positions of the peaks of the two functions are fixed, the total sum of the intensity distribution in a local region is kept constant by the adjustment of the balance between the intensities of the respective peaks, and the center of gravity of the intensity distribution is shifted by $b_j$. Therefore, in cases where the two PD's are located in a pair such that each PD may receive only the image in the vicinity of one of the peaks, the information can be received perfectly.

First, signals, which are generated in the two PD's by the encoded optical distribution carrying the information representing the value of a single element of a vector B, will be considered hereinbelow.

In accordance with the rule of the encoding, in a spatial encoded distribution B', the total intensity is fixed, and the value of a single element of the vector B is expressed by only the balance between the intensities of the two peaks. In a cross correlation distribution C, the value of the element of a vector A has been superposed as the intensity information by a cross correlation operation between the spatial encoded distribution B' and a spatial encoded distribution A'. Therefore, if the value of the single element of the vector B is represented by $b_i$, and the amounts of currents taken out respectively from the two PD's are represented by $I_A$ and $I_B$, the relationship of Formula (7) can be obtained.

$$I_A = a_i \left( \frac{k}{2} - \alpha \frac{b_1}{2} \right)$$
$$I_B = a_i \left( \frac{k}{2} + \alpha \frac{b_1}{2} \right) \quad (7)$$

wherein $\alpha$ and k are fixed numbers. In cases where the encoded optical distributions carrying the information representing the values of the other elements of the vector B are presented to the PD's simultaneously with the aforesaid encoded optical distribution, the amounts of currents $I_A$ and $I_B$ taken out respectively from the two PD's can be represented by the linear sums of Formula (7), which are calculated with the formulas $$I_A = \sum_{i=1}^{N} a_i \left( \frac{k}{2} - \alpha \frac{b_i}{2} \right) \quad (8)$$

$$I_B = \sum_{i=1}^{N} a_i \left( \frac{k}{2} + \alpha \frac{b_i}{2} \right)$$

As in the product sum decoding means described above, the electric operation means, which is connected to the two PD's, carries out the operations for subtraction and multiplying the results of the subtraction by an appropriate fixed number. As a result, the output represented by Formula (9) is obtained.

$$k(I_B - I_A) = \alpha \sum_{i=1}^{N} a_i \cdot b_i \quad (9)$$

This formula is proportional to the mathematical definition formula for the value of the inner product $O = B \cdot A$ of the vector A and the vector B. Therefore, in cases where the value of the fixed number used for the multiplication in the electric operation means is selected appropriately, the output of the electric operation means can directly represent the value of the inner product O of the vector A and the vector B.

As a slightly complicated example, how an operation for finding the value of the inner product of vectors, each of which comprises a plurality of elements, is carried out with the optical product sum operation method will be described hereinbelow.

The operation for finding the value of the inner product of vectors, each of which comprises a plurality of elements, e.g. three elements, is represented by Formula (10) shown below.

When the vector A is represented by $A = (a_1, a_2, a_3)$ and the vector B is represented by $B = (b_1, b_2, b_3)$, the value of the inner product O is represented by $$O = A^T \cdot B = \begin{pmatrix} a_1 \\ a_2 \\ a_3 \end{pmatrix} (b_1 \, b_2 \, b_3) \quad (10)$$

$$= \sum_{i=1}^{3} a_i b_i$$

Figure 5:
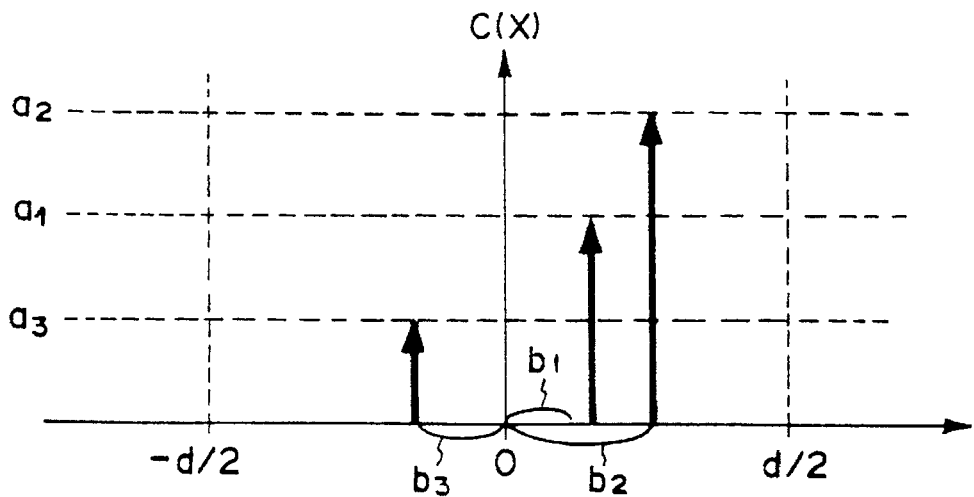
FIG. 5 is an explantory view showing an encoded optical distribution, which is composed of three delta functions.

FIG. 5 shows an example of an encoded optical distribution C(x), which is formed from the two vectors A and B.

In this case, because the number of the elements is three, the encoded optical distribution C(x) is composed of three delta functions, in which the intensities and the positions of the centers of gravity have been modulated in accordance with the values of the corresponding elements (i.e., $a_1$ and $b_1$, $a_2$ and $b_2$, $a_3$ and $b_3$) of the vectors A and B.

The encoded optical distribution C(x) shown in FIG. 5 can be expressed as Formula (11).

$$C = C(x) = a_1 \cdot \delta(x - b_1) + \quad (11)$$
$$a_2 \cdot \delta(x - b_2) +$$
$$a_3 \cdot \delta(x - b_3)$$

The encoded optical distribution C(x), which has been obtained in the manner described above, is presented to the PSD sensor of the product sum decoding means. Specifically, as in cases wherein three delta function-like light beams impinge upon the PSD sensor, an amount of electric charges, which is proportional to the intensity of each light beam, occur in the semiconductor in the vicinity of the point of incidence of each light beam. The amounts of currents, which are taken out as the output currents $I_A$ and $I_B$ from the pair of the output electrodes located at opposite ends of the PSD sensor, are represented respectively by the linear sum of the amounts of currents $I_{A1}, I_{A2},$ and $I_{A3}$, which are caused to occur by the respective light beams, and the linear sum of the amounts of currents $I_{B1}, I_{B2},$ and $I_{B3}$, which are caused to occur by the respective light beams. Specifically, the linear sums are represented by Formulas (12) and (13).

$$I_A = I_{A1} + I_{A2} + I_{A3} \quad (12)$$
$$= \frac{1}{2}\{(I_{C1} + I_{C2} + I_{C3}) - \frac{k}{L}(b_1 I_{C1} + b_2 I_{C2} + b_3 I_{C3})\}$$

$$I_B = I_{B1} + I_{B2} + I_{B3} \quad (13)$$
$$= \frac{1}{2}\{(I_{C1} + I_{C2} + I_{C3}) + \frac{k}{L}(b_1 I_{C1} + b_2 I_{C2} + b_3 I_{C3})\}$$

Thereafter, an electric operation is carried out, in which the difference between the output currents $I_A$ and $I_B$ is multiplied by an appropriate fixed number m. The output obtained from the electric operation is represented by $$m(I_B - I_A) = \frac{2mk}{L}(b_1 I_{C1} + b_2 I_{C2} + b_3 I_{C3}) \quad (14)$$
$$= \frac{2mkh}{L}(b_1 a_1 + b_2 a_2 + b_3 a_3)$$
$$= \frac{2mkh}{L} \sum_{i=1}^{3} b_i a_i$$
$$= \sum_{i=1}^{3} a_i b_i$$

wherein $$m = \frac{1}{2kh}$$

The output is identical with the value of the inner product O of the two vectors A and B, which is defined by Formula (10).

In cases where the encoded optical distribution $C(x)$, which has been formed in accordance with the respective elements of the two vectors comprising a plurality of elements, is presented to the product sum decoding means, which is constituted of the PSD sensor and the difference operation circuit, the operation for finding the value of the inner product of the two vectors can be carried out in the manner described above.

The formation of the encoded optical distribution can be extended to an ordinary operation for finding the value of the inner product of two vectors, each of which comprises a larger number of elements.

An encoded optical distribution $C(x)$, which is constituted of N number of delta function-like light beams, can be represented by Formula (15).

$$C(x) = \sum_{i=1}^{N} \{a_i \cdot \delta(x - b_i)\} \quad (15)$$

In cases where this encoded optical distribution $C(x)$ impinges upon the PSD, the output obtained from the difference operation circuit is represented by Formula (16). Formula (16) represents the value of the inner product of the two vectors, each of which comprises N number of elements.

$$m(I_B - I_A) = \frac{2mkh}{L} \sum_{i=1}^{N} b_i a_i \quad (16)$$
$$= \sum_{i=1}^{N} b_i a_i$$

wherein $$m = \frac{L}{2kh}$$

Figure 6:
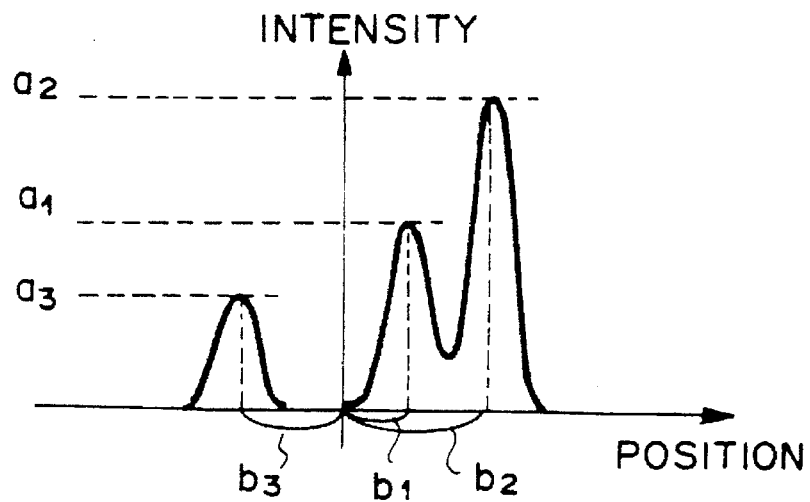
FIG. 6 is an explanatory view showing an encoded optical distribution with a pattern spread like a Gaussian function.
Figure 7:
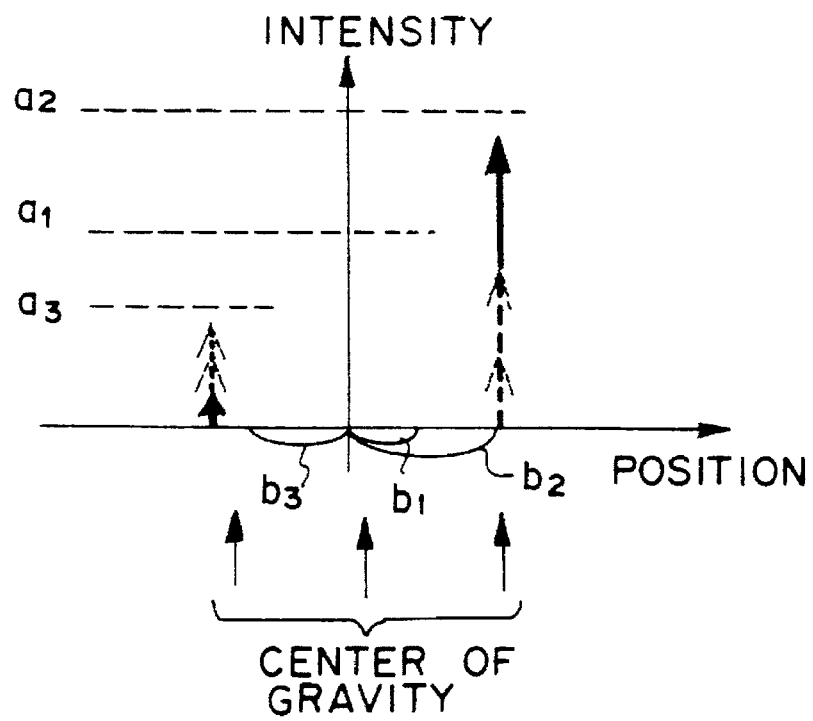
FIG. 7 is an explanatory view showing an encoded optical distribution with a combination of a plurality of delta functions.

As described above in the example of the scalar product, the encoded optical distribution $C(x)$ is not limited to the one constituted of the delta function-like optical peaks. For example, the encoded optical distribution may be the distribution as illustrated in FIG. 6, in which the peaks are spread like a Gaussian function, or the distribution as illustrated in FIG. 7, which is composed of a combination of a plurality of delta functions.

The inner product operation on two vectors is carried out in the manner described above. The operation can be extended to the product sum operation on a vector and a matrix and to the product sum operation on a matrix and a matrix. This is because these product sum operations are composed of a combination of the inner product operations on two vectors.

For example, in the product sum operation on a vector and a matrix as represented by Formula (17), the output becomes a vector having three elements.

$$\begin{pmatrix} O_1 \\ O_2 \\ O_3 \end{pmatrix} = \begin{pmatrix} W_{1,1} & W_{1,2} & W_{1,3} \\ W_{2,1} & W_{2,2} & W_{2,3} \\ W_{3,1} & W_{3,2} & W_{3,3} \end{pmatrix} \begin{pmatrix} a_1 \\ a_2 \\ a_3 \end{pmatrix} \quad (17)$$

The operation can be decomposed into the inner product operations on vectors as represented by Formula (18).

$$O_1 = W_{1,1} a_1 + W_{1,2} a_2 + W_{1,3} a_3,$$
$$O_2 = W_{2,1} a_1 + W_{2,2} a_2 + W_{2,3} a_3, \quad (18)$$
$$O_3 = W_{3,1} a_1 + W_{3,2} a_2 + W_{3,3} a_3,$$

Therefore, in cases where three corresponding encoded optical distributions and three product sum decoding means are prepared and operated simultaneously (i.e., in parallel), the output vector can be obtained without the time required for the operation being increased.

The optical product sum operation is carried out in the manner described above. The encoded optical distribution, which is an important point of the optical product sum operation method, will be defined with mathematical expression hereinbelow.

The encoded optical distribution $C(x)$, which is formed from the values of the elements of the input vector A and the values of the elements of the multiplicand vector B, can be defined as the simple superposition (i.e., the linear sum) of "distributions of light such that the total optical intensity is equal to $a_i$, and the center of gravity is located at the position $b_i$," which are formed from the corresponding elements $a_i$ and $b_i$ of the two vectors. Specifically, the encoded optical distribution $C(x)$ is represented by $$C(x) = \sum_{i=1}^{N} C_i(x) \quad (19)$$

wherein $C_i(x)$ represents arbitrary functions, which satisfy Formulas (20), (21), and (22) and are not negative.

$$a_1 = k \int_{-\infty}^{\infty} C_1(x) dx \qquad (20)$$

$$b_1 = G_P \{C_1(x)\} \qquad (21)$$

$$C_1(x) \geq 0 \quad \text{(in effective light receiving face of sensor)} \qquad (22)$$
$$= 0 \quad \text{(others)}$$

Also, $G_P\{C_i(x)\}$ represents the position of the center of gravity of the distribution.

The embodiment of the optical product sum operation method can be carried out in the manner described above. With the optical product sum operation method, it is possible to carry out a wide variety of operations ranging from the very simple operation for finding the scalar product of two variables to the product sum operation on vectors (and matrixes) having a plurality of elements.

However, in order for only the scalar product of two variables to be obtained, it is sufficient for the conventional electronic computer to be used, and the optical product sum operation method need not necessarily be employed.

The cases, in which the optical product sum operation method carried out in the optical operation apparatus in accordance with the present invention exhibits its advantages, are the cases wherein the product sum operations on large numbers of elements are processed. This is because the product sum operations, which cannot easily be carried out with an electronic computer, can be carried out quickly with the parallel processing function utilizing light. However, in the optical product sum operation method, it is necessary to carry out the step for forming the encoded optical distribution. If the step for forming the encoded optical distribution cannot be carried out quickly, the advantages of the total processing capability cannot be expected.

In this embodiment, methods for carrying out the "optical encoding" by utilizing the optical techniques will be illustrated. These methods take up the position of the initial process in the processes for constituting and designing actual systems from the principle.

The methods for carrying out the optical encoding can be roughly classified into three methods. The respective distribution forming methods will be described hereinbelow by taking the generation of an encoded optical distribution (shown in FIG. 8), which is to be used for the product sum operation on vectors having three elements, as an example.

Figure 8:
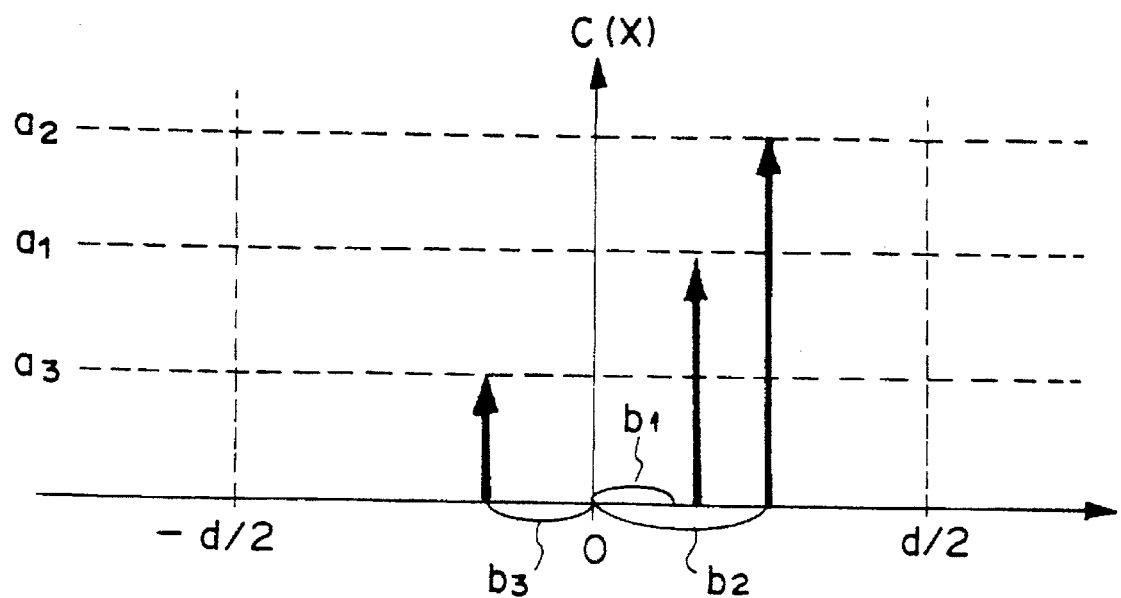
FIG. 8 is an explanatory view showing an encoded optical distribution for a product sum operation between vectors having three elements.

With the method shown in FIG. 8, the intensities and the positions are encoded simultaneously for all of the elements of the respective vectors, and the "encoded optical distribution" is formed straightly. In order to generate the encoded optical distribution, it is possible to employ a plurality of light emitting devices, such as a laser array, and light modulating or deflecting devices, such as an array of special light modulators (hereinafter referred to as the SLM's).

1) Intensity-modulating light emitting devices and spatial light gates

The term "intensity-modulating light emitting device" as used herein means a laser diode (hereinafter referred to as the LD) or a light emitting diode (hereinafter referred to as the LED). The term "spatial light gate" as used herein means an optical shutter, in which a certain spatial portion alone transmits light. As the spatial light gate, a liquid crystal array, or the like, may be used.

Figure 9:
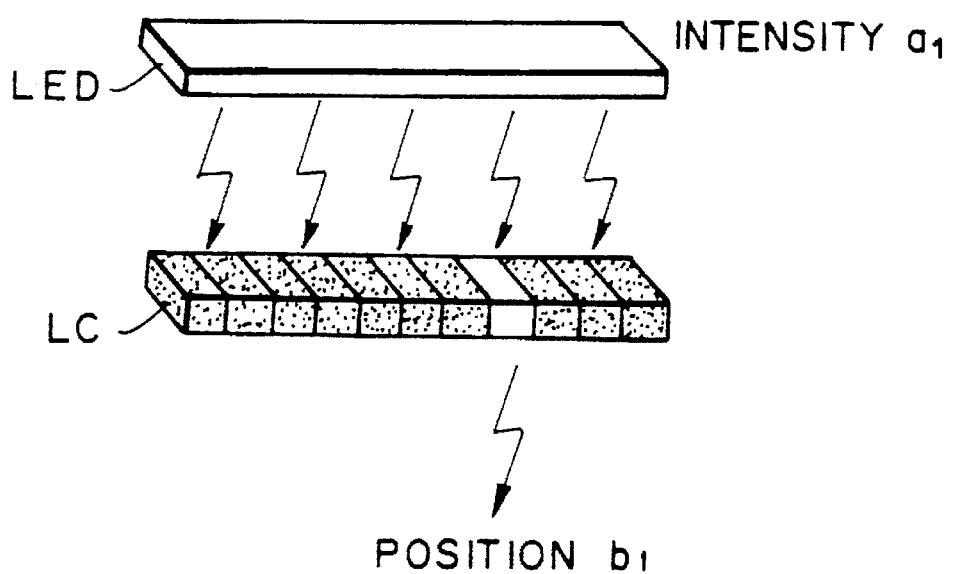
FIG. 9 is an explanatory view showing how an intensity and a position are encoded with a intensity-modulating light emitting device and a spatial light gate.

As an example of using the intensity-modulating light emitting device and the spatial light gate, as illustrated in FIG. 9, the light emitting device and the optical shutter are superposed one upon the other. First, the light emitting device (for example, a surface-like LED) is caused to emit light uniformly. The intensity of light emission is set to be proportional to the value of a first element of the first vector. Thereafter, only a portion of light is transmitted by the optical shutter. The position, at which the portion of light is transmitted, is set to be proportional to the value of a first element of the second vector.

Figure 10:
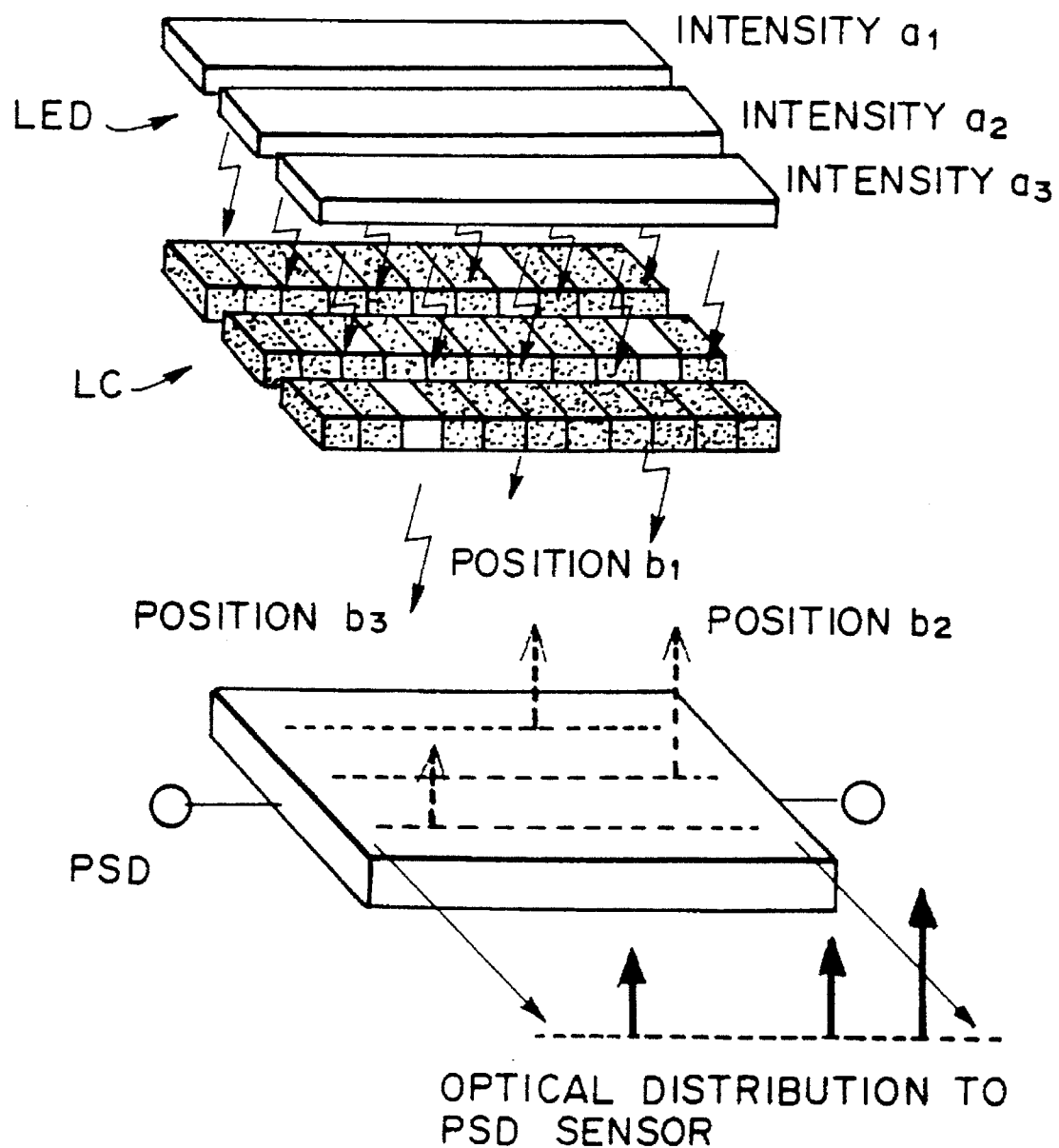
FIG. 10 is an explanatory view showing how a plurality of intensity-modulating light emitting devices and a plurality of spatial light gates are located, and light is received by a PSD sensor having sensitivity in the longitudinal direction.

In an example shown in FIG. 10, a plurality of combinations of the light emitting devices and the optical shutters are located side by side. The intensities of light emission of the light emitting devices are set to be proportional to the values of the elements of the first vector. Also, the positions, at which portions of light are transmitted, are set to be proportional to the values of the elements of the second vector. After light has passed through the three optical shutters, which are located side by side, optical distributions are obtained respectively such that the intensity is equal to $a_1$ at the position $b_1$, such that the intensity is equal to $a_2$ at the position $b_2$, and such that the intensity is equal to $a_3$ at the position $b_3$. Thereafter, the three optical distributions are presented simultaneously to a PSD sensor, which has a light receiving area covering all of the three optical distributions and has the detection capability along the longitudinal direction of the light emitting devices and the optical shutters. The PSD sensor has no resolution along the transverse direction of the light emitting devices and the optical shutters. Therefore, the three optical distributions are detected by the PSD sensor as being superposed one upon another. Accordingly, the combination of the optical distributions, which are formed by the light emitting devices and the optical shutters, is detected by the PSD sensor as the desired "encoded optical distribution."

2) Intensity-modulating light emitting devices and light deflecting devices

An example, in which the intensity-modulating light emitting devices and light deflecting devices are used in combination, will be described hereinbelow. As described above, LD's or LED's are used as the intensity-modulating light emitting devices. The term "light deflecting devices" as used herein means the devices capable of bending light to a desired direction. For example, prisms or reflecting mirrors may be used as the light deflecting devices. Alternatively, optical and mechanical mechanisms, which rotate the light emitting devices, may be utilized as the light deflecting devices. As another alternative, the light emitting devices may be provided with the functions for controlling the light radiating direction, and the functions may serve as the functions of the light deflecting devices.

Figure 11:
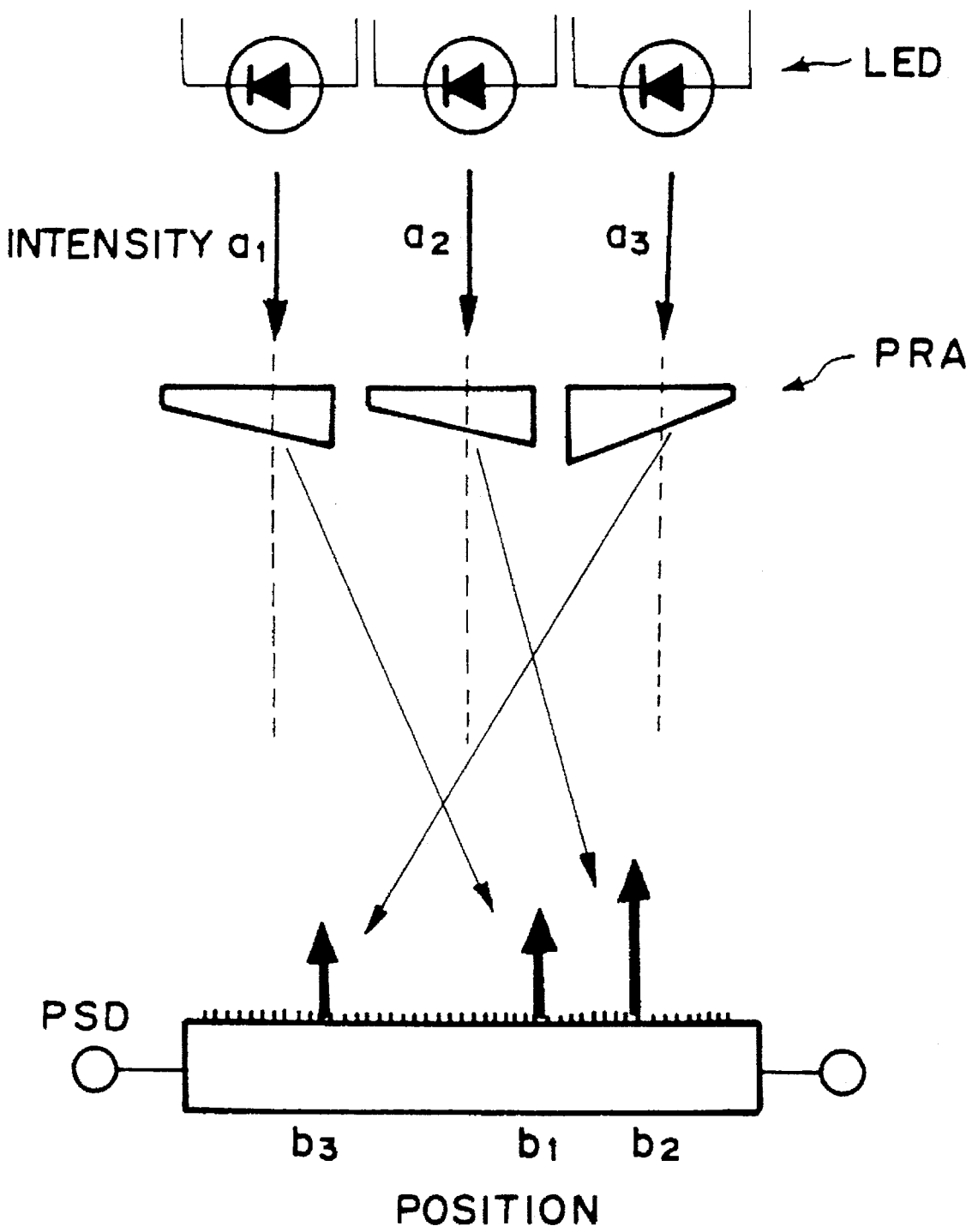
FIG. 11 is an explanatory view showing how a plurality of intensity-modulating light emitting devices and a light deflecting means are located, and an encoded optical distribution is generated on a PSD sensor.

FIG. 11 shows an example of the combination of the intensity-modulating light emitting devices and the light deflecting devices. In FIG. 11, three light emitting devices emit light having intensities proportional to the values of the elements of the first vector. The light radiated out of each light emitting device is guided by the corresponding light deflecting device to the PSD sensor such that the light may impinge upon the position corresponding to the value of one of the elements of the second vector. In this example, prisms are used as the light deflecting devices.

A method for optically composing an encoded optical distribution from optical distributions, each of which has been encoded for one of the elements of the first vector and for one of the elements of the second vector, will be described hereinbelow.

In a first step, optical distributions, in each of which the intensity and the position have been encoded for one of the elements of the first vector and for one of the elements of the second vector, are formed. Thereafter, in a second step, these optical distributions are superposed one upon another by an optical means, and the "encoded optical distribution" is thereby formed.

As in the constitution described above, a constitution will be described hereinbelow by taking the generation of the encoded optical distribution from the vectors having three elements as an example.

Figure 12:
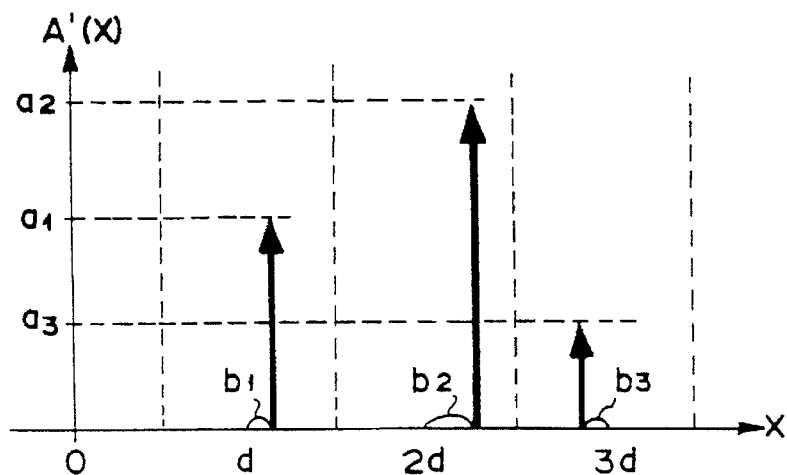
FIG. 12 is an explanatory view showing how the encoded optical distributions, each of which has been encoded for one of elements of a first vector and for one of elements of a second vector, are generated at different locations in the space.

As illustrated in FIG. 12, at different locations in the space (in this case, in regions having a width of d and having their centers at d, 2d, and 3d), optical distributions are respectively generated such that the intensities and the shifts in position from the centers of the regions may be $a_1$ and $b_1$, $a_2$ and $b_2$, and $a_3$ and $b_3$, respectively.

Figure 13:
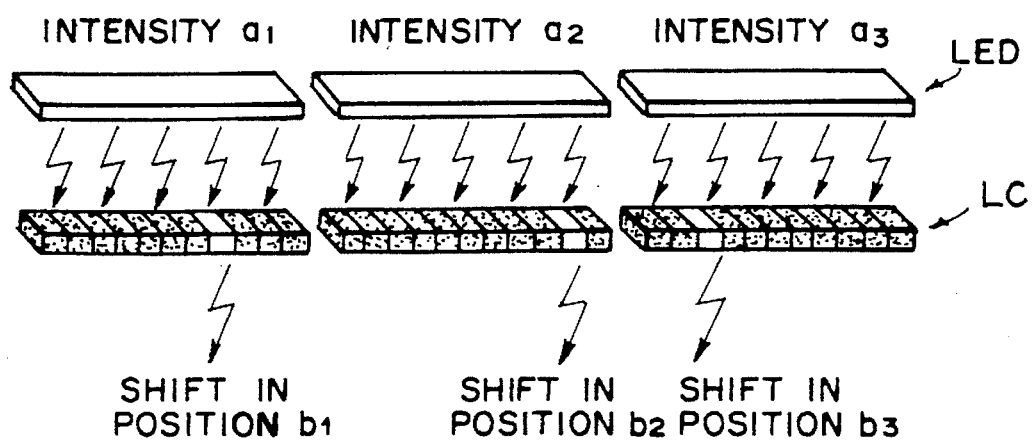
FIG. 13 is an explanatory view showing how the encoded optical distributions, each of which has been encoded for one of the elements of the first vector and for one of the elements of the second vector, are generated at different locations in the space by a combination of surface light emitting devices and a light shutter.
Figure 14:
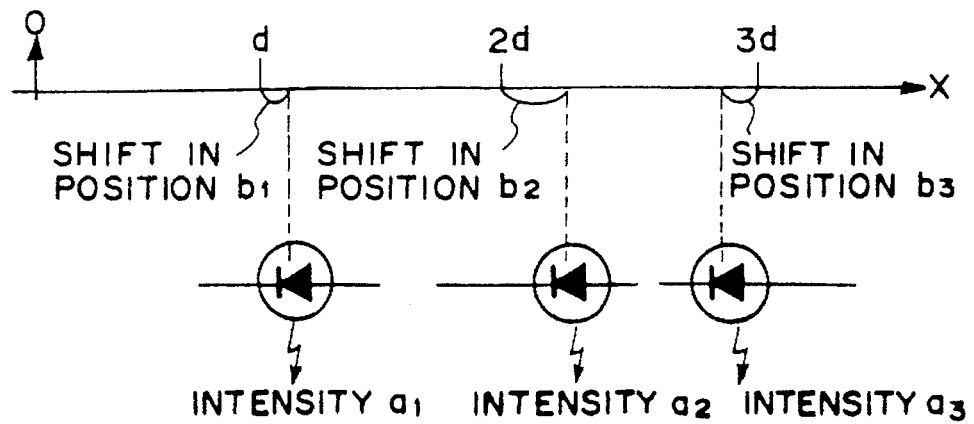
FIG. 14 is an explanatory view showing how the encoded optical distributions, each of which has been encoded for one of the elements of the first vector and for one of the elements of the second vector, are generated at different locations in the space by point light emitting devices and a mechanical means for controlling the positions of light emission of the point light emitting devices.

In order for such optical distributions to be generated, as illustrated in FIG. 13, it is possible to utilize an optical means, typically combinations of surface light emitting devices and optical shutters. Alternatively, as illustrated in FIG. 14, a mechanical means for controlling point light emitting devices and the positions of light emission of the point light emitting devices may be utilized.

Figure 15:
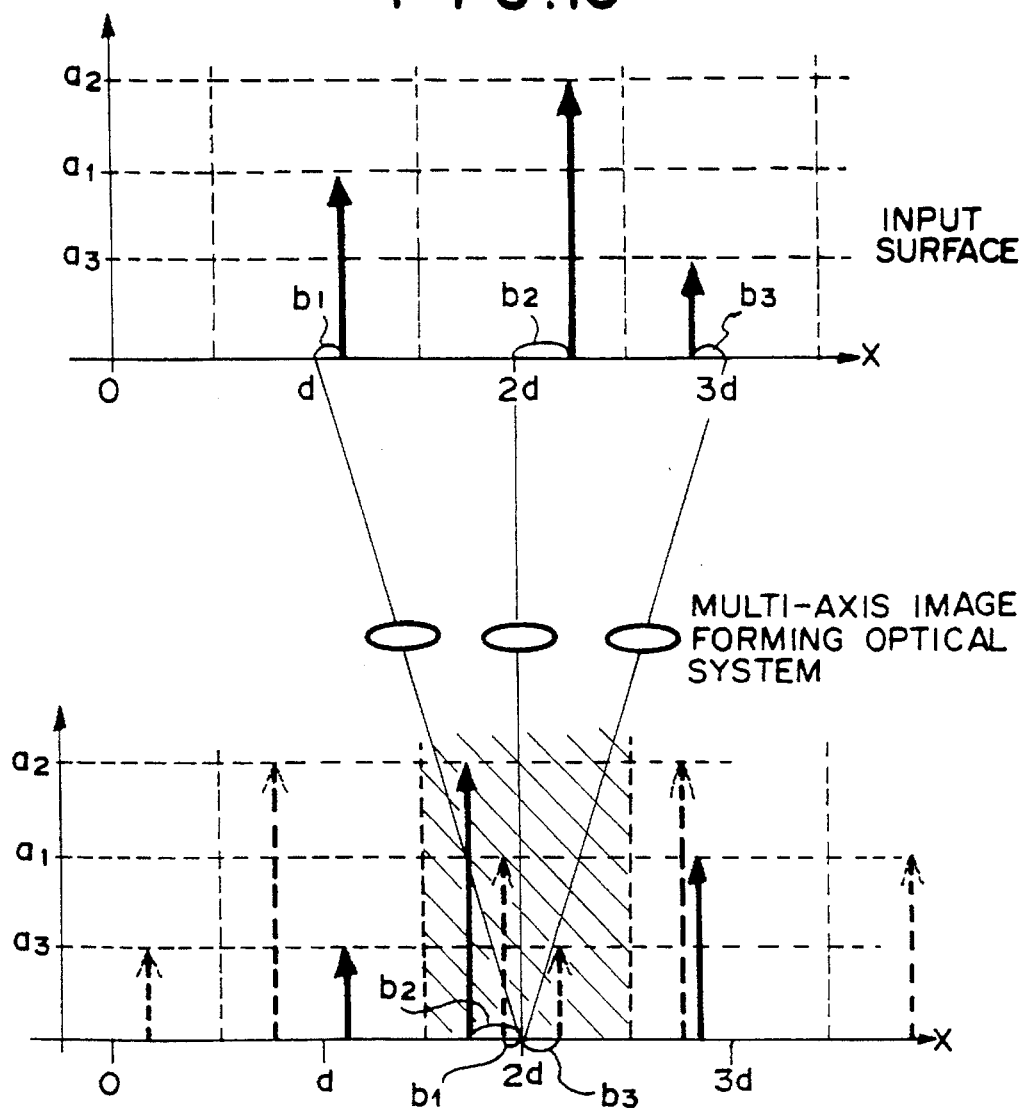
FIG. 15 is an explanatory view showing how an encoded optical distribution is generated by superposing the encoded optical distributions, each of which has been encoded for one of the elements of the first vector and for one of the elements of the second vector, one upon another by an optical means.

Thereafter, the encoded optical distributions, which have thus been formed and in each of which the intensity and the position have been encoded for one of the elements of the first vector and for one of the elements of the second vector, superposed one upon another by the optical means for the superposition. As illustrated in FIG. 15, the optical superposition can be carried out by utilizing a multiple image forming optical system. From the optical superposition, an encoded optical distribution is obtained at the middle part of the surface of image formation.

Thus the feature of the utilization of light is that the optical signals can be easily superposed one upon another. Light beams can travel in the space without striking against one another. Therefore, even if the optical distributions are formed for markedly larger numbers of elements than in the example shown in FIG. 15, the optical distributions can be collected in an instant onto a single sensor.

In the foregoing, as an aid in facilitating the explanation, the optical distributions, in each of which the intensity and the position have been encoded for one of the elements of the first vector and for one of the elements of the second vector, are located at "different locations in the space" (i.e., in the regions having a width of d and having their centers at d, 2d, and 3d). However, the regions need not necessarily be located at equal intervals and in the one-dimensional pattern as shown in FIG. 15. The regions may be located at different intervals and/or in patterns other than the one-dimensional pattern, e.g. in a two-dimensional pattern.

Methods for generating the encoded optical distribution by utilizing cross correlation will be described hereinbelow.

First, a distribution, in which the intensities have been encoded in accordance with the values of the elements of the first vector, and a distribution, in which the positions have been encoded in accordance with the values of the elements of the second vector, are formed independently of each other. Thereafter, when an operation for finding the cross correlation between the two distributions is carried out, the necessary "encoded optical distribution" appears in the cross correlation distribution. Based on such characteristics, the operation for finding the cross correlation is carried out optically. In this manner, the encoded optical distribution is formed in an instant.

As in the foregoing, the method for generating the encoded optical distribution by utilizing cross correlation will be described hereinbelow by taking the generation of the encoded optical distribution from the vectors having three elements as an example.

Figure 16:
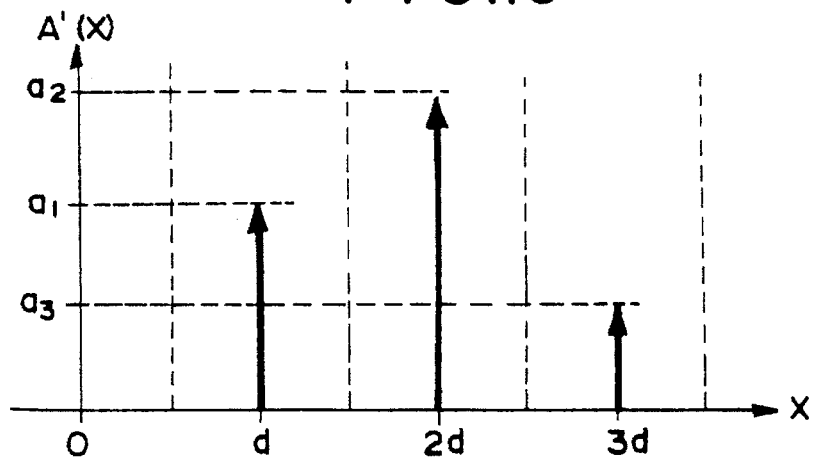
FIG. 16 is an explanatory view showing how the intensities are encoded in accordance with the values of the elements of the first vector.

As illustrated in FIG. 16, the encoding of intensities in accordance with the values of the elements of the first vector is to form the distributions, which respectively have the intensities equal to $a_1$, $a_2$, and $a_3$, at different locations in the space (in this case, in regions having a width of d and having their centers at d, 2d, and 3d). The distributions will hereinbelow be referred to as the encoded distribution A'.

Figure 17:
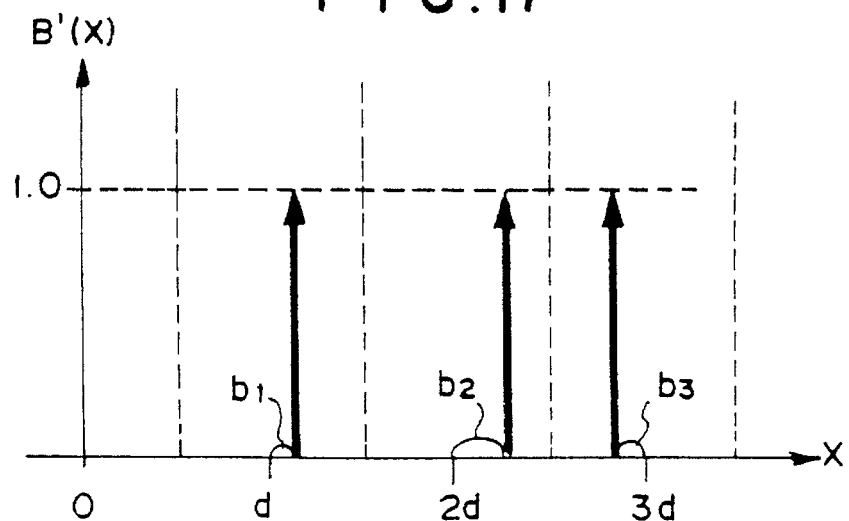
FIG. 17 is an explanatory view showing how the positions, at which the centers of gravity are located, are encoded in accordance with the values of the elements of the second vector.

Also, as illustrated in FIG. 17, the encoding of positions in accordance with the values of the elements of the second vector is to form the distributions at different locations in the space (in this case, in regions having a width of d and having their centers at d, 2d, and 3d) such that the shifts in the positions of the centers of gravity from the centers of the regions may be equal to $b_1$, $b_2$, and $b_3$, respectively, and such that the intensities may be identical with one another. The distributions are hereinafter referred to as the encoded distribution B'.

Figure 18:
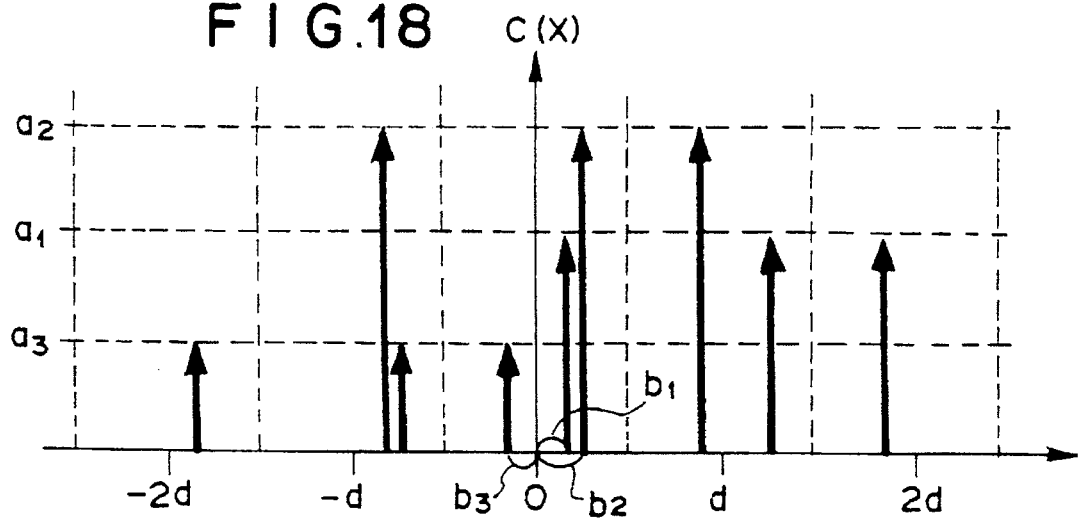
FIG. 18 is an explanatory view showing a cross correlation distribution C(x) between an encoded distribution A' and an encoded distribution B'.

A cross correlation distribution C(x) obtained from the encoded distribution A' and the encoded distribution B' is defined by Formula (23). FIG. 18 shows the actual cross correlation distribution C(x).

$$C(x) = \int_{-\infty}^{\infty} A'(u-x)B'(u)du \qquad (23)$$

Figure 19:
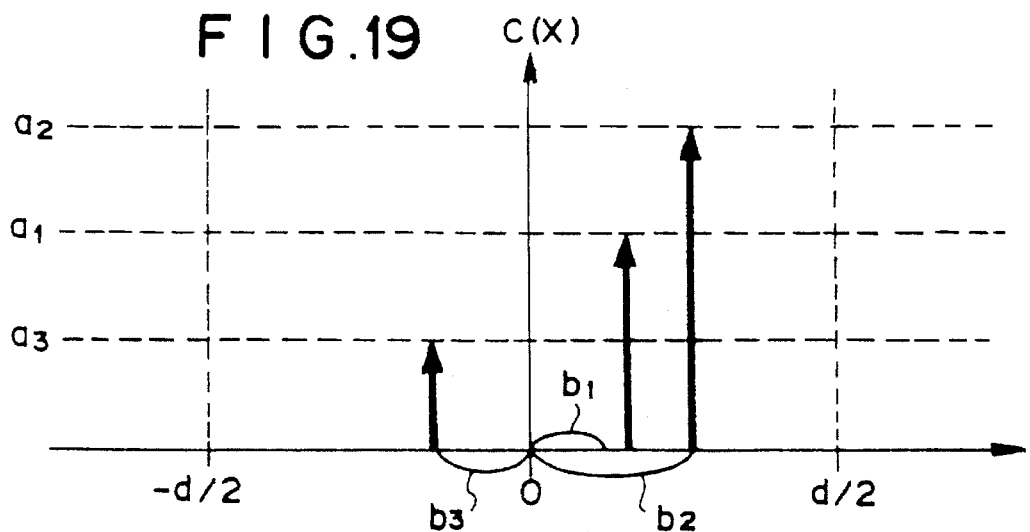
FIG. 19 is an explanatory view showing a middle part of the cross correlation distribution C(x) shown in FIG. 18.

In cases where the encoded distribution A' and the encoded distribution B' are constituted of the delta functions as illustrated in FIGS. 16 and 17, and only the region ($-d/2 < x < d/2$) having a width of d and having its center at $x=0$ in the cross correlation distribution C(x) is considered as a remark region, the points, at which the cross correlation distribution C(x) can have values other than zero in the remark region, are only the three points of $b_i$ (i=1, 2, 3). Also, as represented by Formula (24), the intensities at these points become equal to $a_i$ (i=1, 2, 3). The state in the remark region is illustrated in detail in FIG. 19.

$$C(b_1) = a_1$$

$$C(b_2) = a_2$$

$$C(b_3) = a_3 \qquad (24)$$

As described above, the distribution at the middle part of the cross correlation distribution obtained from the intensity encoded distribution, which is formed from the first vector, and the position encoded distribution, which is formed from the second vector, is the desired "encoded optical distribution."

The method for obtaining a cross correlation distribution from two distributions with an optical technique has been known widely.

How an optical correlator with an incoherent optical system, which has been applied conventionally, operates basically will be described hereinbelow.

Figure 20:
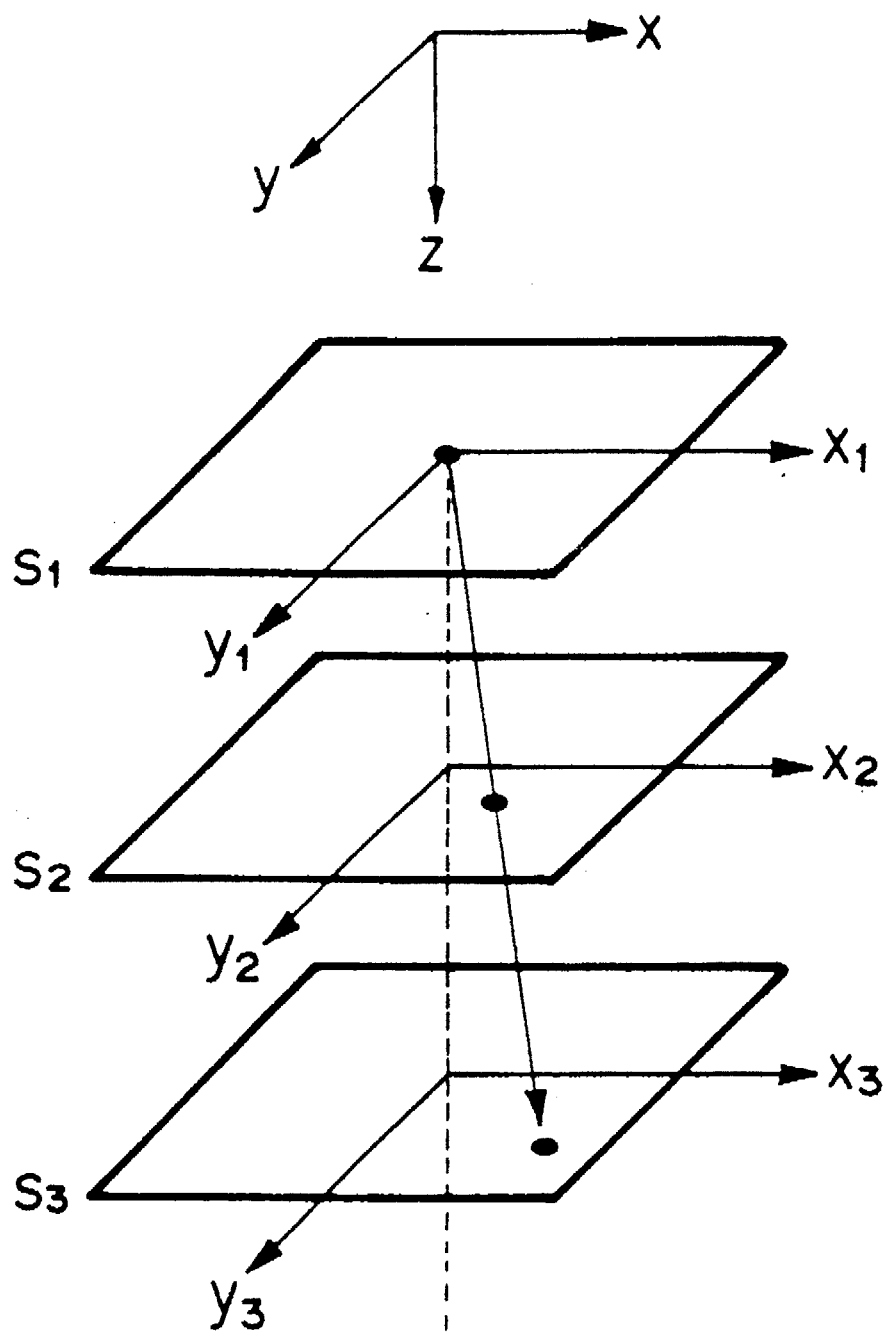
FIG. 20 is an explanatory view showing an example of a correlator utilizing light.

FIG. 20 is an explanatory view showing a basic operation of an optical correlator. With reference to FIG. 20, a coordinate system (x, y, z) is set in the space, and three surfaces $S_1$, $S_2$, and $S_3$ are set at equal intervals and in parallel with the (x, y) surface. Coordinate systems $(x_1, y_1)$, $(x_2, y_2)$, and $(x_3, y_3)$ are respectively set in parallel with the surfaces $S_1$, $S_2$, and $S_3$ such that their origins may coincide with the z axis.

A pinhole is formed at the origin of the surface $S_2$. A medium, e.g. a slide, having a transmittance distribution of $f(x_1, Y_1)$ is placed on the surface $S_1$. A diffusing light source is placed on the side outward from the surface $S_1$, and light is irradiated to the medium. At this time, as in a pinhole camera, an inverted image having the distribution of $f(x_1, y_1)$ is formed on the surface $S_3$. The light amount distribution on the surface $S_3$ is proportional to $f(-x_3, -y_3)$.

The pinhole is moved from the origin to a point having the coordinates ($\xi$, $\eta$). The image formed on the surface $S_3$ shifts by a distance $2\xi$ along the $x_3$ axis direction and by a distance $2\eta$ along the $y_3$ axis direction. Also, the light amount distribution becomes $f(-x_3+2\xi, -y_3+2\eta)$. The pinhole, which has moved, can be expressed as $\delta(x_2-\epsilon, -y_3+2\eta)$. Therefore, it can be found that the image formed on the surface $S_3$ is determined by the position of the pinhole.

Thereafter, a medium having a transmittance distribution $g(x_2, y_2)$ is placed on the surface $S_2$. In view of properties of light, this system is a linear system, and the principle of superposition obtains. Therefore, the transmittance distribution $g(x_2, y_2)$ can be calculated easily. Because the transmittance distribution $g(x_2, y_2)$ can be expanded to Formula (25)

$$g(x_2,y_2) = \int\int_{-\infty}^{\infty} g(\xi,\eta)\delta(x_2-\xi, y_2-\eta)d\xi d\eta \qquad (25)$$

it can be considered that the transmittance distribution $g(x_2, y_2)$ results from the superposition of pinholes $\delta(x_2-\epsilon, y_2-\eta)$ with a weight factor $g(\epsilon, \eta)$. Therefore, the image formed on the surface $S_3$ can be represented as a weighted sum of $f(-x_3+2\epsilon, y_3+2\eta)$. Specifically, the image formed on the surface $S_3$ can be represented by Formula (26).

$$\int\int_{-\infty}^{\infty} f(-x_3+2\xi,-y_3+2\eta)g(\xi,\eta)d\xi d\eta \qquad (26)$$

When Formula (27) is defined, $$\hat{e}(x_1,y_1)\equiv f(-2x_1, -2y_1) \qquad (27)$$

Formula (26) can be rewritten as $$\int\int_{-\infty}^{\infty} \hat{f}\left(\xi-\frac{x_3}{2},\eta-\frac{x_3}{2}\right)g(\xi,\eta)d\xi d\eta \qquad (28)$$

The formula thus obtained represents the correlation between the functions $\hat{f}(x, y)$ and $g(x, y)$ Specifically, a transmittance distribution medium, which carries the information representing a figure or a formula after being enlarged by a factor of 2 in two directions, is placed on the surface $S_1$. Also, a transmittance distribution medium, which carries the information representing a figure or a formula, is placed on the surface $S_2$. Thereafter, diffusing light is irradiated to the surface $S_1$. In this manner, an intensity distribution proportional to the correlation can be obtained on the surface $S_3$.

In cases where light is utilized in this manner, the correlation operations can be carried out easily by using the combination of the transmittance distribution media and the light source. The operations are carried out perfectly in parallel, and therefore can be carried out quickly.

The embodiment described above is one of examples of basic operations of the optical correlator. The same operations can be carried out also by utilizing one of various other optical arrangements or various other optical elements. All of such possible optical arrangements and optical elements are not described herein. However, general definition can be made by introducing the concept of the transfer function, which is utilized in the field of information processing.

The transfer function is a function characterizing the relationship between an input and an output. When input information is converted into output information by a certain procedure, the procedure used can be expressed as the transfer function.

It has been known that, as for an optical system, a function, which is obtained by carrying out Fourier transform of a point spread function h (also referred to as impulse response) of the optical system, constitutes a transfer function S.

In general, if the input is represented by I, the output is represented by O, and the point spread function is represented h, the relationship shown below obtains.

$$O=h*I \qquad (29)$$

wherein * represents the convolution. If the sign of the axis is reversed, the convolution operation will be equivalent to the correlation. Therefore, the operation of the optical correlator is equivalent to the operation, wherein the correlation between the optical intensity distribution I on the input surface and the point spread function h of the optical system is fed out as the optical intensity distribution O to the output surface. In the example described above, if the optical intensity distribution on the input surface, i.e. on the surface $S_1$ in FIG. 20, is represented by I, and the optical intensity distribution on the output surface, i.e. on the surface $S_3$ in FIG. 20, is represented by O, the light transmittance distribution on the intermediate surface $S_2$ will correspond to the point spread function h.

As described above, the output image, which is obtained by "locating an optical pattern having the first distribution on an optical input surface, and forming an image on an output surface of the optical system by an image forming optical system having a point spread function (hereinafter referred to as the PSF) similar to the second distribution," becomes similar to the cross correlation between the first and second distributions.

In view of the definition of the cross correlation, the same cross correlation distribution can be obtained by exchanging the locations of the first and second distributions, i.e., by "locating the second distribution on the optical input surface, and forming an image on the output surface of the optical system by an image forming optical system having a PSF similar to the first distribution."

First, a constitution, in which the first distribution is taken as the optical input pattern, and the second distribution is taken as the PSF of the image forming optical system, will be described hereinbelow.

Figure 21:
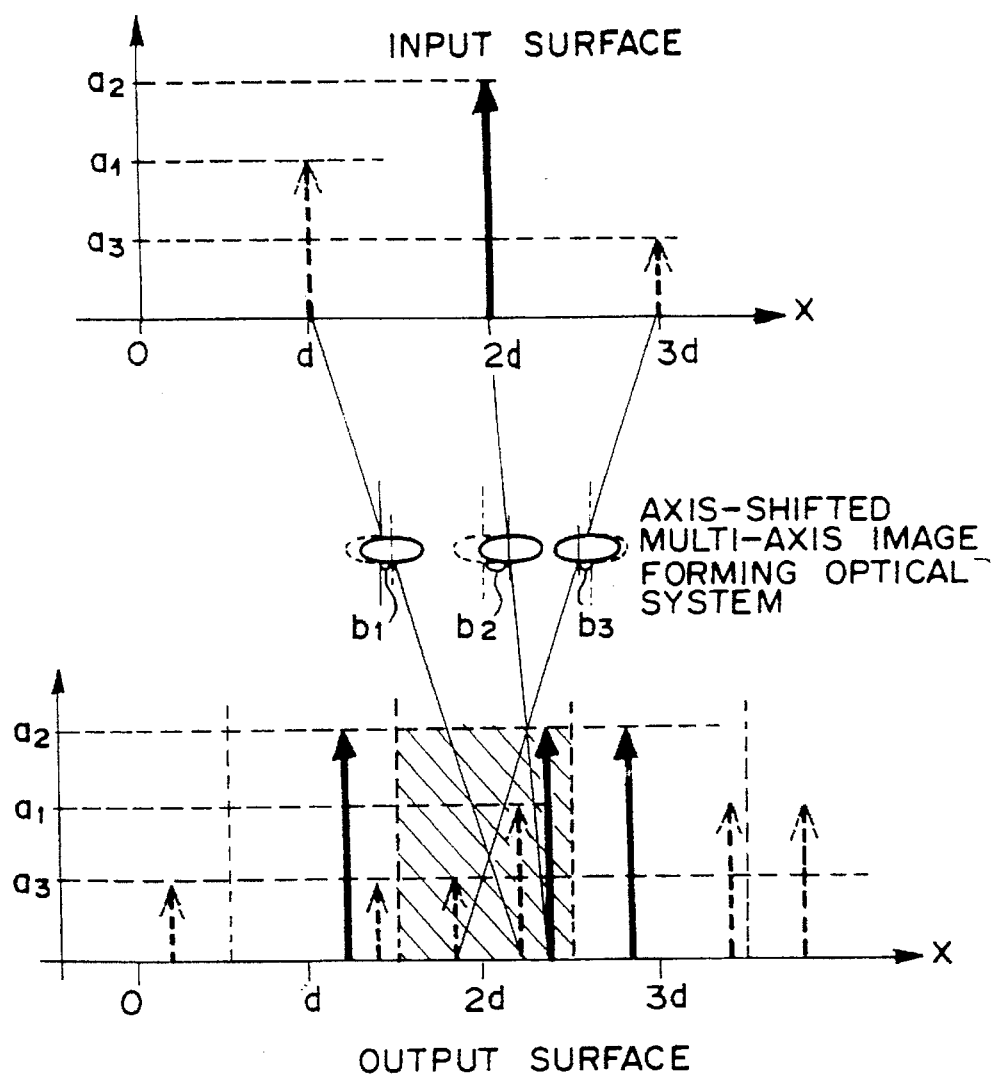
FIG. 21 is an explanatory view showing a constitution, in which a first distribution is taken as an optical input pattern, and a second distribution is taken as a point spread function (PSF) of an axis-shifted multi-axis image forming optical system.
Figure 22:
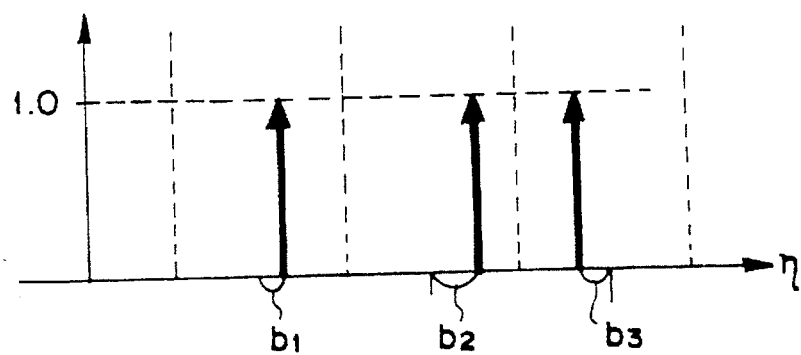
FIG. 22 is an explanatory view showing the point spread function (PSF) of the axis-shifted multi-axis image forming optical system shown in FIG. 21.

As illustrated in FIG. 21, an optical distribution, which has three peaks of the intensities corresponding to the values of the elements $a_1$, $a_2$, and $a_3$ of the first vector, is located on the input surface. Thereafter, the input optical distribution is radiated (with multiple image formation) to the output surface by using three lenses, which are located such that the output images may be shifted in position by distances corresponding to the values of the elements $b_1$, $b_2$, and $b_3$ of the second vector. As a result, the cross correlation distribution of the two distributions is obtained on the output surface. As illustrated in FIG. 22, in cases where the three lenses located in the manner described above are regarded together as a single optical input and output system, the PSF of the optical input and output system is similar to the position encoded distribution, which is formed from the second vector.

A constitution, in which the arrangement described above is reversed, i.e. in which the second distribution is taken as the optical input pattern, and the first distribution is taken as the PSF of the image forming optical system, will be described hereinbelow.

Figure 23:
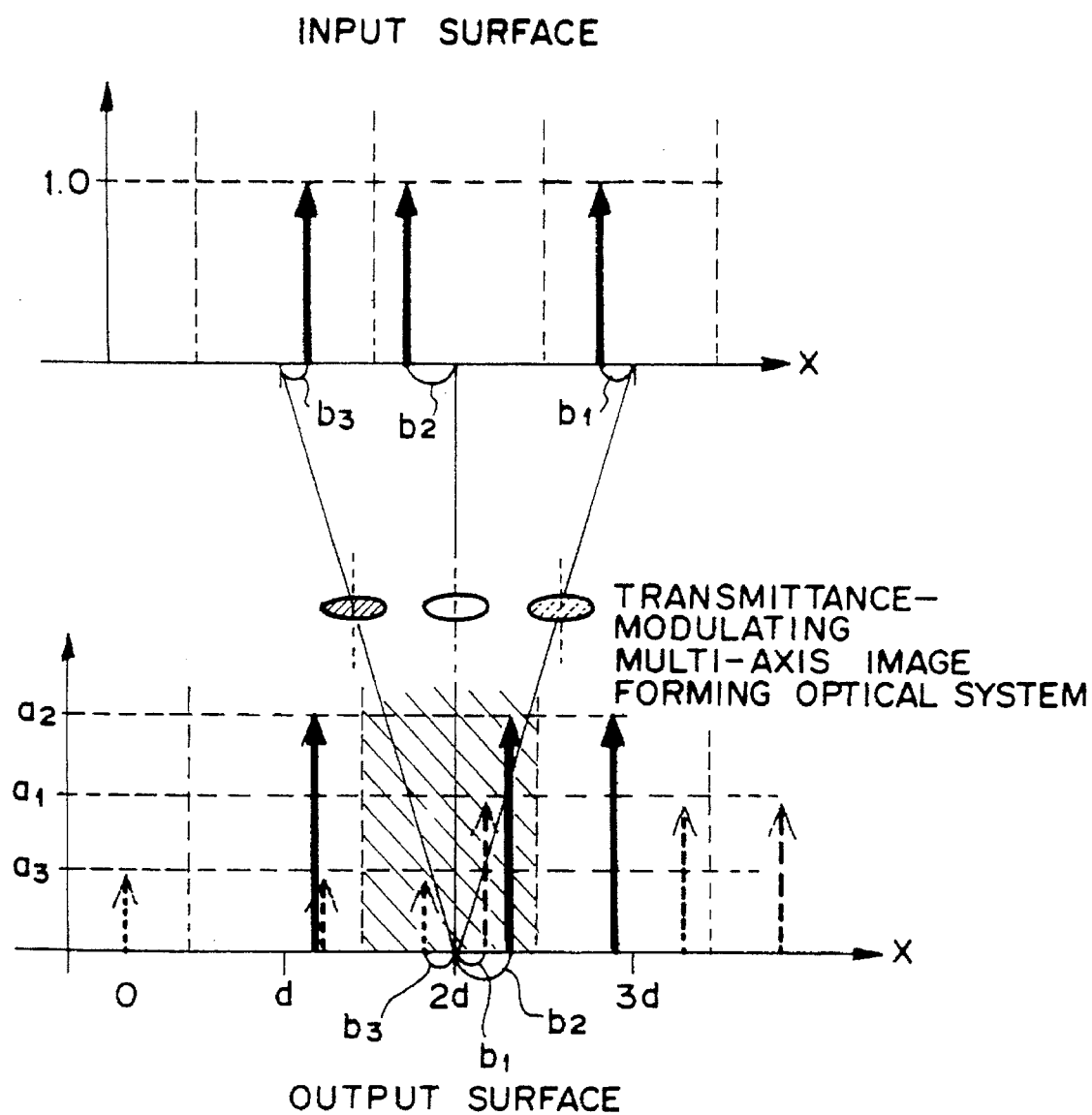
FIG. 23 is an explanatory view showing a constitution, in which the second distribution is taken as an optical input pattern, and the first distribution is taken as a point spread function (PSF) of a transmittance-modulating multi-axis image forming optical system.
Figure 24:
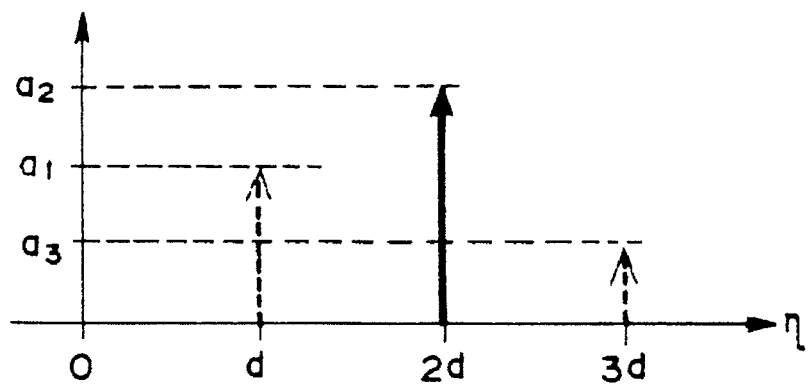
FIG. 24 is an explanatory view showing the point spread function (PSF) of the transmittance-modulating multi-axis image forming optical system shown in FIG. 23.

As illustrated in FIG. 23, an optical distribution, which has three peaks shifted in position by distances corresponding to the values of the elements $b_1$, $b_2$, and $b_3$ of the second vector, is located on the input surface. The input optical distribution is radiated (with multiple image formation) to the output surface by using three lenses, which have light transmittances corresponding to the values of the elements $a_1$, $a_2$, and $a_3$ of the first vector and are located at equal intervals. As a result, as in the embodiment shown in FIG. 21, the cross correlation distribution of the two distributions is obtained on the output surface. As illustrated in FIG. 24, the PSF of the three lenses located in this manner is similar to the intensity encoded distribution, which is formed from the first vector.

Only the middle part of the cross correlation distribution, which has been obtained in the manner described above, is taken up and caused to impinge upon the PSD sensor. The optical distribution thus obtained constitutes the desired "encoded optical distribution."

In the embodiments described above, as the methods for carrying out the optical encoding, the methods for carrying out three modes are employed.

As for the time required for the encoding, if either one of the vectors is fixed, the processing will be completed at the velocity of light. However, if both of the vectors are variable, the processing speed will depend on the capability of the functional devices, which are used respectively for the intensity encoding and the position encoding. Therefore, it is necessary to select devices appropriate for the designed system.

The optical product sum operation method may be basically carried out in the manner described above, and the optical product sum operation system may be basically constituted in the manner described above. Optical product sum operation methods, in which the functions are further specified and extended, and constitutions of apparatuses for carrying out the optical product sum operation methods will be described hereinbelow.

First, how the size of an operation system can be reduced with local processing will be described hereinbelow.

In the field of the signal processing, the product sum operations on a portion of an input data string, which comprises a large number of elements, and a data string, which comprises a number of elements markedly smaller than the number of the elements of the input, are carried out very frequently.

One of typical examples is the processing for searching a specific data pattern from a certain data string. Also, a kernel convolution operation, which is used very frequently in image processing algorithms, comprises a group of local product sum operations, in which image signals are taken as input vectors, and kernels are taken as multiplicand matrixes.

The "local product sum operation" can be considered as being the processing for multiplying the input vector A by a multiplicand vector W, which is a "non-dense matrix." The local product sum operation can be represented by Formula (30). The matrix W is a "non-dense matrix," in which the elements of each column have values only in a limited region. Therefore, actually, the product sum operation on the elements of a portion of the input vector A and a portion of the column elements is carried out by being limited to a local region. Accordingly, as is clear from Formula (31), the operation can be regarded as being a group of the product sum operations on vectors having numbers of elements markedly smaller than the sizes of the original vector and the original matrix.

$$O = AW = (O_1\ O_2\ \ldots\ O_{N-2}) \quad (30)$$

$$= \begin{pmatrix} a_1 \\ a_2 \\ a_3 \\ \vdots \\ \vdots \\ a_N \end{pmatrix}^T \begin{pmatrix} W_{1,1} & 0 & \ldots & 0 \\ W_{1,2} & W_{2,2} & \ldots & : \\ W_{1,3} & W_{2,3} & \ldots & : \\ 0 & W_{2,4} & \ldots & 0 \\ : & 0 & \ldots & W_{N-2,N-2} \\ : & : & \ldots & W_{N-3,N-1} \\ 0 & 0 & \ldots & W_{N-2,N} \end{pmatrix}$$

$$= \left( \begin{pmatrix} a_1 \\ a_2 \\ a_3 \end{pmatrix}^T \begin{pmatrix} W_{1,1} \\ W_{1,2} \\ W_{1,3} \end{pmatrix} \ldots \begin{pmatrix} a_{N-2} \\ a_{N-1} \\ a_N \end{pmatrix}^T \begin{pmatrix} W_{N-2,N-2} \\ W_{N-3,N-1} \\ W_{N-2,N} \end{pmatrix} \right) \quad (31)$$

Further, in cases where local arrays of the elements in the respective columns are the same as is represented by Formula (32), the vector-matrix product can be represented by Formula (33), which is simpler.

$$W_{11} = W_{22} = \ldots = W_{N-2,N-2},$$
$$W_{12} = W_{23} = \ldots = W_{N-2,N-1}, \quad (32)$$
$$W_{13} = W_{24} = \ldots = W_{N-2,N},$$

$$O = AW \quad (33)$$
$$= \left( \left\{ \begin{pmatrix} a_1 \\ a_2 \\ a_3 \end{pmatrix}^T \ldots \begin{pmatrix} a_{N-2} \\ a_{N-1} \\ a_N \end{pmatrix}^T \right\} \begin{pmatrix} W_{N-2,N-2} \\ W_{N-3,N-1} \\ W_{N-2,N} \end{pmatrix} \right)$$

The operation, in which Formula (32) obtains, i.e. in which the local arrays of the elements in the respective columns are the same, corresponds to a space invariant convolution operation (i.e., the product sum operation on all of local data strings in the data and a single kernel). An operation, in which the local arrays of the elements in the respective columns are not the same, corresponds to a space variant convolution operation.

In the local operation processing described above, because the multiplicand vector W is a "non-dense matrix," the system size can easily be kept small. Particularly, in the cases of the "space invariant" operation, a constitution may be employed, in which an encoded distribution comprising a small number of elements is used for every portion of the input vector A. In this manner, the multiplicand vector W can be expressed by only the single small encoded distribution, and the system size can be reduced even further.

An example of a system for carrying out the space variant convolution operation will be described hereinbelow.

Figure 25:
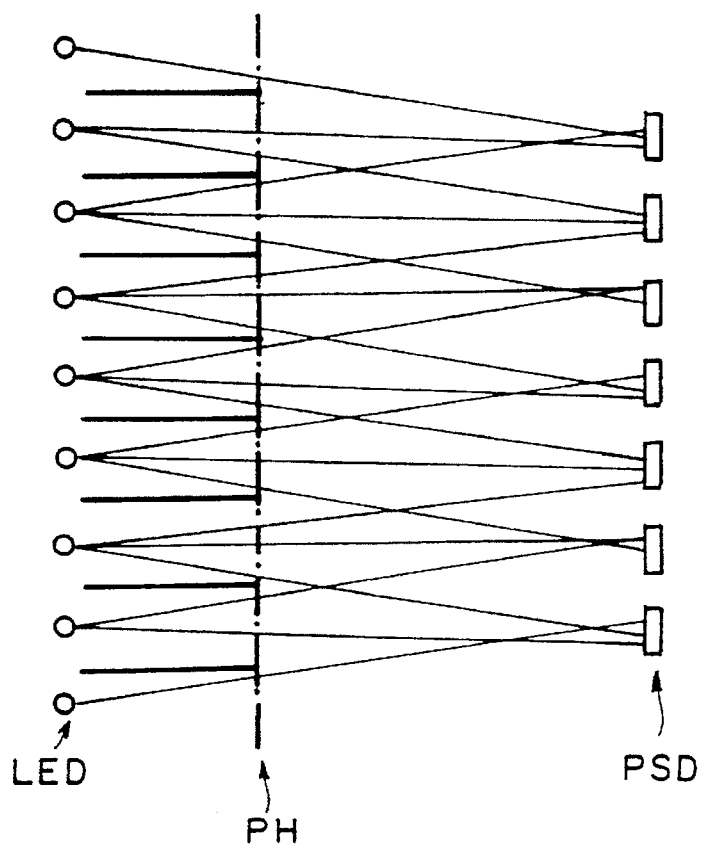
FIG. 25 is an explanatory view showing a system for carrying out space variant local convolution.

FIG. 25 shows an example of a constitution of an optical product sum operation system for carrying out the space variant convolution operation. As represented by Formula (31), in the space variant convolution operation, a plurality of product sum operations are carried out on the elements of a portion of the input vector A and a portion of the column elements by being limited to local regions. In order for such operation to be carried out, an encoded optical distribution may be formed by using the information representing only the necessary portion of the elements of the input vector and may be caused to impinge upon the PSD sensor.

This constitution comprises a plurality of the constitutions for the "technique for forming the encoded optical distribution by intensity-modulating light emitting devices and light deflecting devices" described above. However, in this case, a single light emitting device corresponds to a plurality of light deflecting devices. As illustrated in FIG. 25, devices LED's, which emit light having the intensities corresponding to the values of the elements of the input vector, are located on the left side. Devices (pinholes) PH's, which control the directions of travel of light in accordance with the matrix elements W, are located at the middle part. Also, a PSD sensor, which receives the optical distributions, and an electric operation circuit, which receives output electric signals from the PSD sensor and carries out the product sum decoding, are located on the right side. Because the matrix elements W are of the non-dense matrix, elements having a value of 0 can be omitted. Therefore, only the number of light deflecting devices as small as three may be utilized for a single light emitting device, and a practical constitution becomes possible. (If the matrix is not the non-dense matrix, the density of the light deflecting devices will become very high, and a practical system cannot be constituted.)

Figure 26:
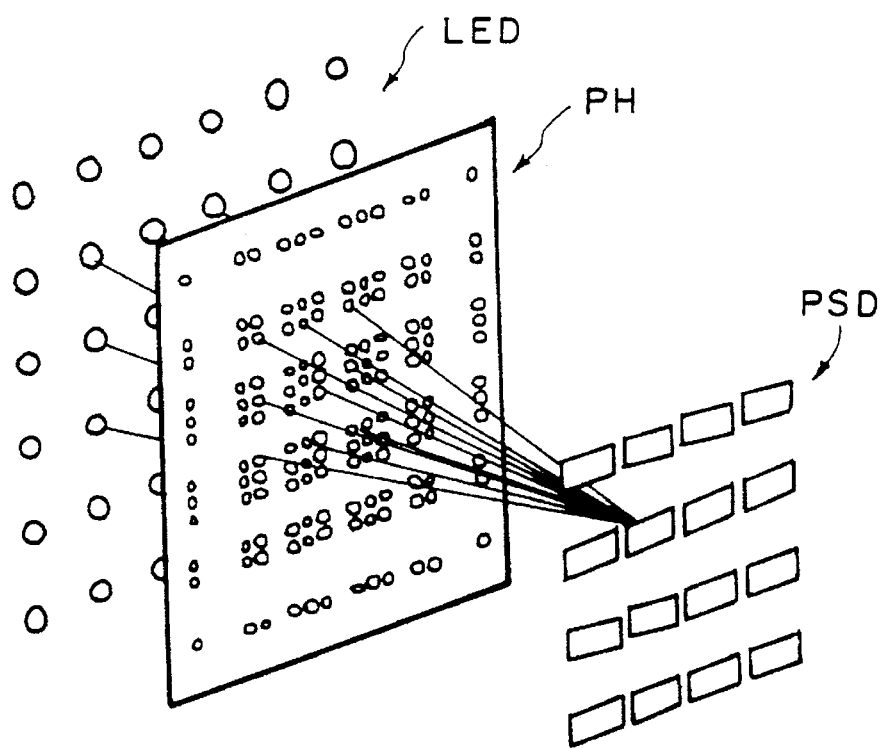
FIG. 26 is an explanatory view showing a (two-dimensional) system for carrying out space variant local convolution.

As illustrated in FIG. 26, the constitution described above can be easily extended to a two-dimensional constitution.

FIG. 26 shows a typical example of a two-dimensional space variant convolution operation apparatus. The LED's arrayed in two-dimensional directions are utilized for the input. In the cases of the space variant operations, the multiplicand matrix is independent for every local region of the input. Therefore, multiplicand matrixes are set for the respective local regions of the input. In this example, as in the one-dimensional space variant convolution operation apparatus, a multi-pinhole optical system, which comprises a plurality of pinhole arrays PH's, is employed for the multiplicand matrixes. The position of each pinhole array PH is shifted slightly along the horizontal direction in the plane of the multi-pinhole optical system in FIG. 26 in accordance with the value of the convolution kernel. For reasons of the condition of the overlapping degree of the multiple images, the distance between the input surface and the multi-pinhole optical system and the distance between the multi-pinhole optical system and the PSD array can be kept very short.

FIG. 27 shows an example of a constitution of an optical product sum operation system for carrying out the space invariant convolution operation. As represented by Formula (33), in the space invariant convolution operation, the matrix elements, which are subjected to the product sum operation with the input vector, are similar to one another. Therefore, a constitution, in which the matrix elements are utilized in common, becomes possible.

In the system shown in FIG. 27, the "technique for forming the encoded optical distribution by utilizing cross correlation" described above is employed. In FIG. 27, an LED array having the optical intensity distribution of the elements of the input vector is located on the left side. An optical system constituted of a pinhole array PH, in which the matrix elements W are taken as the PSF, is located at the middle part. Also, a PSD sensor, which receives the optical distributions, and an electric operation circuit, which receives output electric signals from the PSD sensor and carries out the product sum decoding, are located on the right side. The feature of this system is that only the single optical system, in which the matrix elements W are taken as the PSF, is utilized in common as the means for generating all encoded optical distributions. (In FIG. 27, the single optical system generates seven encoded optical distributions.) As a result, the density of the optical circuit can be kept very high, the devices can be utilized efficiently, and the system size can be kept small.

Alternatively, as illustrated in FIG. 28, an LED array having the distribution corresponding to the matrix elements W may be located on the left side, and an optical system, which is constituted of SLM's and in which the elements of the input vector are taken as the PSF, may be located at the middle part. In this manner, the same encoded optical distributions as those in FIG. 27 can be obtained. The constitution shown in FIG. 27 or the constitution shown in FIG. 28 may be selected in accordance with the characteristics of the light emitting devices, the optical system, the SLM's, and the like, which are used, and the applications of the system.

Figure 29:
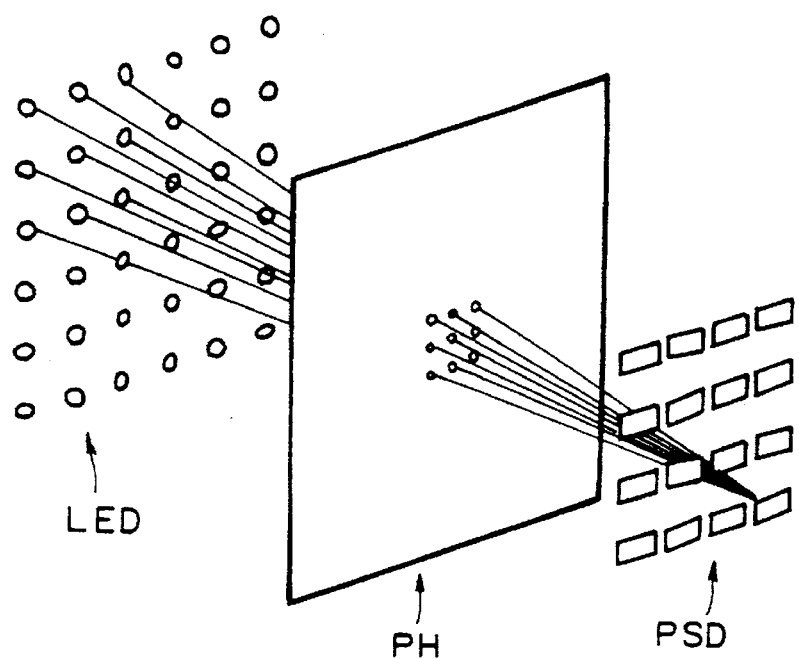
FIG. 29 is an explanatory view showing a (two-dimensional) system for carrying out space invariant local convolution.
Figure 30:
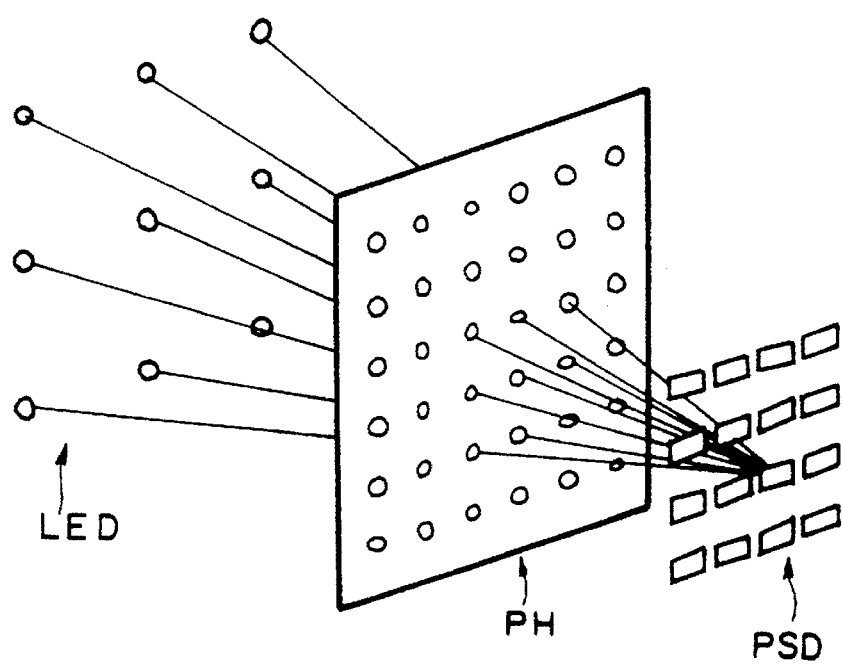
FIG. 30 is an explanatory view showing a (two-dimensional) system for carrying out space invariant local convolution.

As in the space variant system, the space invariant system can be extended to two-dimensional constitutions. FIGS. 29 and 30 show examples of the two-dimensional space invariant systems.

In FIG. 29, LED's arrayed in two-dimensional directions are utilized for the input. In the cases of the space invariant operations, the multiplicand matrix can be utilized in common for every local region of the input, and therefore only the single multiplicand matrix may be used. In this example, a multi-pinhole optical system is employed for the multiplicand matrix. As in a pinhole camera, each pinhole forms the image of the input on the sensor surface of each of PSD's of a PSD array. However, because a plurality of the pinholes are located, the image is formed as multiple images, in which a plurality of images have been superposed one upon another. The position, at which each pinhole is open, is shifted slightly along the horizontal direction in the plane of the multi-pinhole optical system in FIG. 29 in accordance with the value of the convolution kernel, from a basic position such that the LED's of the input may overlap one upon another on the sensor surface by being shifted by a distance corresponding to the length of a single LED. As a result, each of the multiple images is also shifted. The results of the operation are outputted by the same number of the PSD's as the number of the output elements and an electric operation circuit.

in FIG. 30, a two-dimensional pinhole array PH, which is capable of effecting spatial modulation, is utilized for the input. An illuminating optical system, which is constituted of a light emitting device array LED, is utilized for the multiplicand matrix. The pinhole array PH of the input is illuminated by the respective point light sources, and an image (a shadow image) is projected onto the sensor surface of each of PSD's of a PSD array. However, because a plurality of the point light sources are located, the projected image is formed as multiple images, in which a plurality of images have been superposed one upon another. The position, at which each point light source is located, is shifted slightly along the horizontal direction in the plane of the LED array in FIG. 30 in accordance with the value of the convolution kernel, from a basic position such that the projected images of the point light sources may overlap one upon another on the sensor surface by being shifted by a distance equal to the length of a single projected image. As a result, each of the multiple images is also shifted. The results of the operation are outputted by the same number of the PSD's as the number of the output elements and an electric operation circuit.

As described above, by the limitation of the range of the processing to the local region, a parallel optical product sum operation system, which is very compact, can be built up. The limitation of the range of the processing will lead to reduction in the flexibility. However, processing in local regions has heretofore been carried out very often, and the adaptability of the local optical sum operation to such processing is high. In particular, the optical product sum operation method employed in the present invention can be easily extended to two-dimensional directions and therefore can be expected to be applied to image processing. In the conventional picture element-sequential processing, if the size of the image processed becomes large, the time required for the operation processing will become long. However, with the optical product sum operation method employed in the present invention, wherein the parallel processing is carried out, even if the size of the image processed becomes large, the time required for the operation can be kept short. Specifically, the optical product sum operation method in accordance with present invention is markedly adaptive to the field of image processing, or the like, in which an enormous amount of information is processed.

As a different way of extension of the optical product sum operation method, a technique for an operation on an input vector and a plurality of multiplicand vectors will be described hereinbelow.

Figure 31:
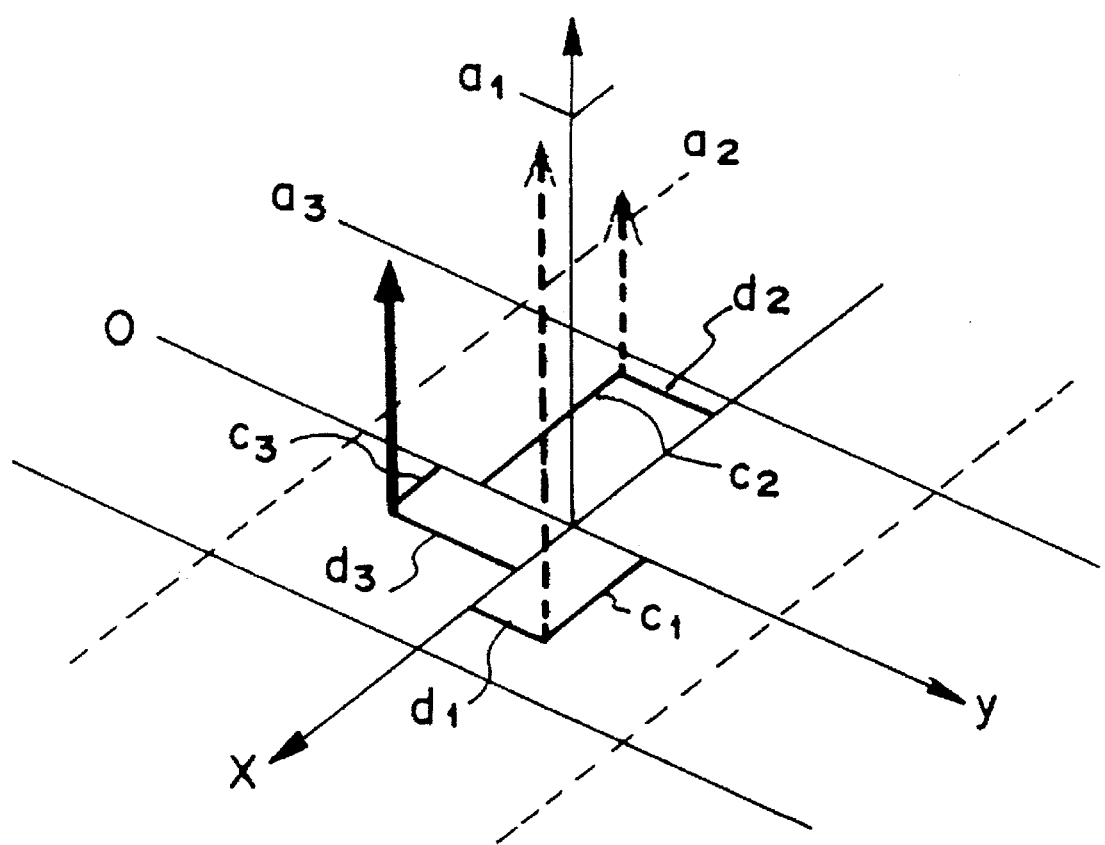
FIG. 31 is an explanatory view showing an encoded distribution for carrying out product sum operations in parallel on a single input vector and two different vectors.
Figure 32:
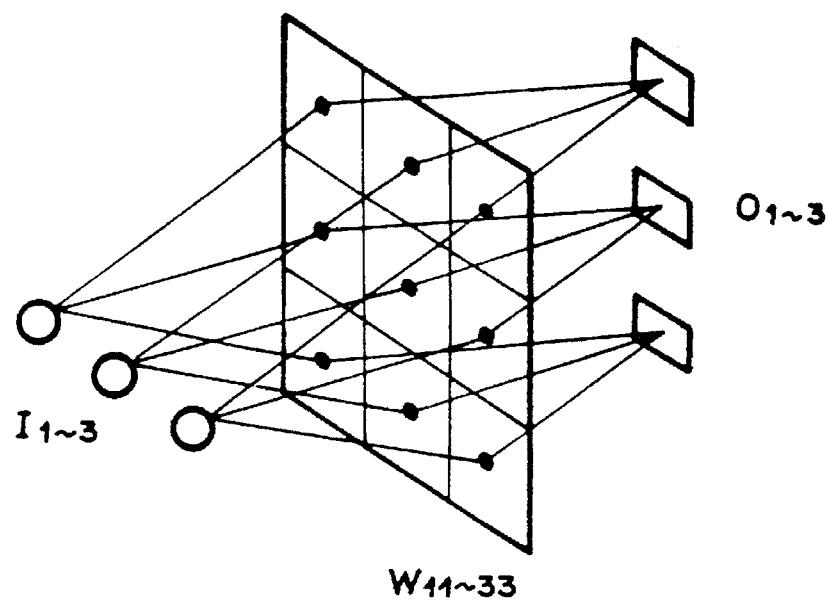
FIG. 32 is an explanatory view showing the concept behind a vector-matrix multiplication with a spatial integration method.
Figure 33:
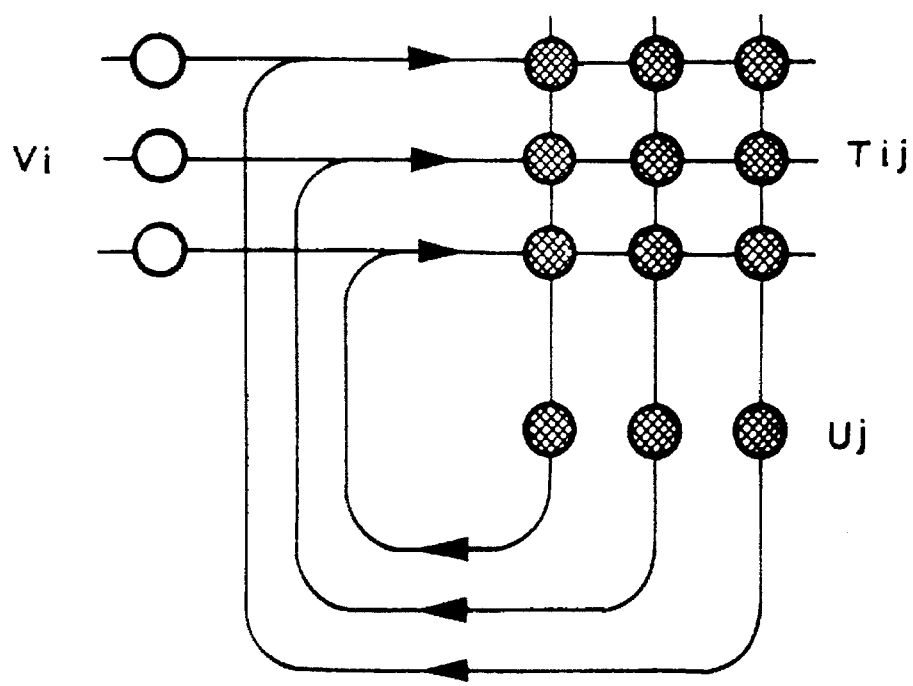
FIG. 33 is an explanatory view showing a Hopfield model, which is one of typical neural network models.
Figure 34:
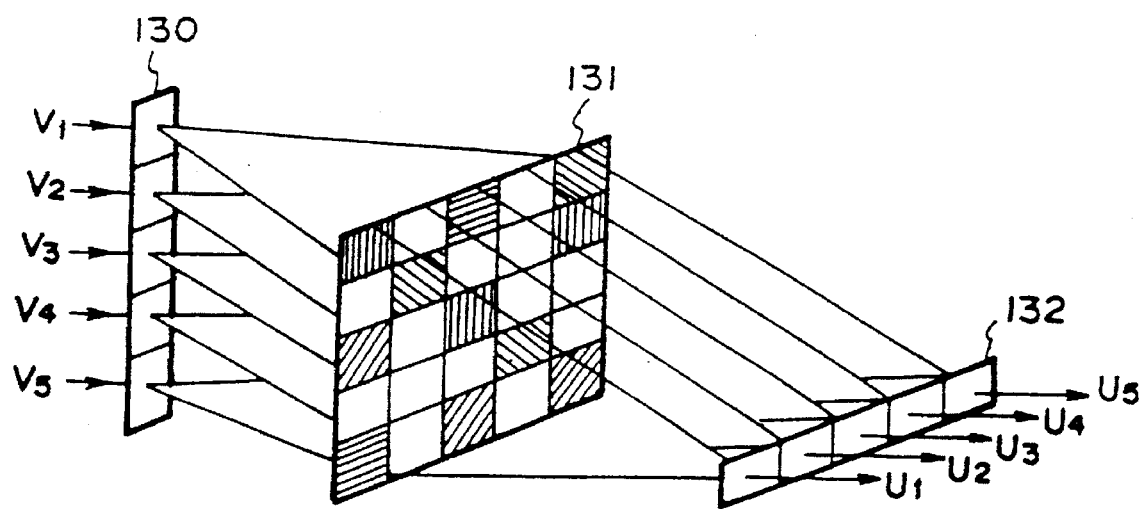
FIG. 34 is an explanatory view showing a constitution for optical implementation of the Hopfield model proposed by D. Psaltis, et al.
Figure 35:
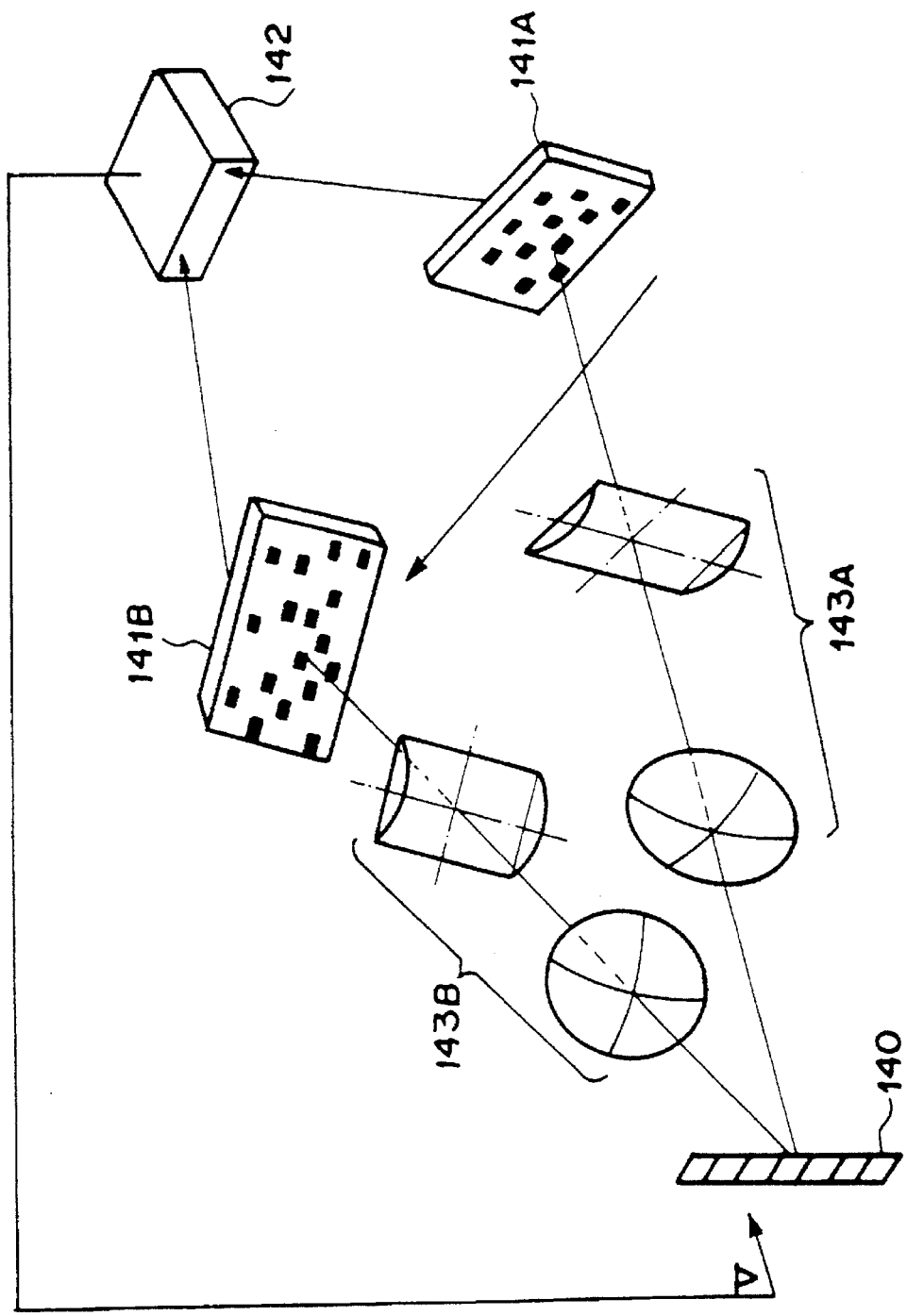
FIG. 35 is an explanatory view showing a constitution for optical implementation of the Hopfield model proposed by D. Psaltis, et al.

In the embodiments described above, the position encoding is carried out such that the position may be shifted in one-dimensional direction. In cases where the position encoding is extended to two-dimensional directions, the value of the sum of the product A·D and the value of the sum of the product A·E between a single input vector A and two different vectors D and E can be obtained simultaneously without an additional constitution being added to the apparatus. An example of an encoded distribution of such a type is shown in FIG. 31.

In order to obtain the value of the product sum, a two-dimensional PSD is used which has two independent detection axes. With the two-dimensional PSD, output signals can be obtained independently of each other with respect to the two axes, which intersect perpendicularly to each other. Therefore, in cases where the operations for calculating the difference between the output currents, which are obtained from the respective output electrodes, and multiplying the difference by an appropriate fixed number are carried out independently, the values of the sums of products D·E, A·D, and A·E among the vector A and two different multiplicand vectors D and E can be obtained by using the single optical cross correlation operation means.

In this manner, complicated operations, e.g. complex number operations and composite operations, such as $\alpha A \cdot D + \beta A \cdot E$, can be carried out perfectly in parallel.

With the examples of the constitutions for the optical product sum operation method described above, the vectors or the matrixes are encoded, the encoded optical distribution is formed, and the product sum operation is thereby carried out.

With the optical product sum operation method in accordance with the present invention, the parallel propagation characteristics of light are utilized, and large amounts of vector-matrix product sum operations can be carried out at an instant. Also, by the utilization of the position of light as the information, the processing of negative values, which was not possible in the past, becomes possible.

Further, with the optical product sum operation method in accordance with the present invention, the three modes described above can be utilized. On the basis of the three modes, the designer can select an optimum implementing method in accordance with the adaptability to the optical technique which can be utilized. Therefore, the degree of freedom of the selection in designing the optical operation apparatus and devices in accordance with the present invention can be kept high.

The optical operation apparatus in accordance with the present invention is not limited to the embodiments described above and can be embodied in various other ways.

What is claimed is:

1. An optical operation apparatus for carrying out an operation for finding an inner product of a first vector and a second vector by utilizing light, the optical operation apparatus comprising:
    i) an optical vector encoding means for forming an encoded distribution, which is based on all of elements of the first and second vectors, and in which the intensities have been encoded in accordance with the values of the elements of the first vector, and the centers of gravity of local intensities have been position encoded in accordance with the values of the element of the second vector, and
    ii) a product sum decoding means for extracting a value of an inner product of the first vector and the second vector in accordance with said encoded distribution, which has been formed by said optical vector encoding means, and feeding out the information representing said inner product value.

2. An apparatus as defined in claim 1 wherein said product sum decoding means comprises an optical signal detecting means, which generates electric signals in accordance with the intensities and the positions of received light, and an electric operation means, which carries out an operation on the electric signals having been generated by said optical signal detecting means.

3. An apparatus as defined in claim 1 or 2 wherein said optical vector encoding means comprises an optical distribution generating means for generating an encoded optical distribution, which is based on all of the elements of the first and second vectors, and which has been optical intensity encoded and position encoded.

4. An apparatus as defined in claim 1 or 2 wherein said optical vector encoding means is provided with:
    a) an optical distribution generating means for generating encoded optical distributions, each of which has been optical intensity encoded for one of the elements of the first vector and position encoded for one of the elements of the second vector,
    b) a multiple image forming optical system for superposing said encoded optical distributions, each of which has been encoded for one of the elements of the first vector and for one of the elements of the second vector, one upon another, and thereby generating an encoded optical distribution, which is based on all of the elements of the first and second vectors, and
    c) an output surface, to which said encoded optical distribution based on all of the elements of the first and second vectors is fed out,
    said encoded optical distributions, each of which has been encoded for one of the elements of the first vector and for one of the elements of the second vector, being fed out to said output surface by said multiple image forming optical system,
    whereby said encoded optical distribution based on all of the elements of the first and second vectors is fed out to said output surface.

5. An apparatus as defined in claim 1 or 2 wherein said optical vector encoding means is provided with:
    a) an optical distribution generating means for generating an optical intensity encoded distribution of the first vector,
    b) an optical system, in which a position encoded distribution of the second vector is taken as a point spread function, and
    c) an output surface, to which an encoded optical distribution based on all of the elements of the first and second vectors is fed out, said optical intensity encoded distribution of the first vector being fed out to said output surface by said optical system, whereby said encoded optical distribution based on all of the elements of the first and second vectors is fed out to said output surface.

6. An apparatus as defined in claim 1 or 2 wherein said optical vector encoding means is provided with:

a) an optical distribution generating means for generating a position encoded distribution of the second vector, b) an optical system, in which an optical intensity encoded distribution of the first vector is taken as a point spread function, and c) an output surface, to which an encoded optical distribution based on all of the elements of the first and second vectors is fed out, said position encoded distribution of the second vector being fed out to said output surface by said optical system, whereby said encoded optical distribution based on all of the elements of the first and second vectors is fed out to said output surface.

* * * * *